US012757197B2

(12) United States Patent
Jung et al.

(10) Patent No.: US 12,757,197 B2
(45) Date of Patent: Oct. 6, 2026

(54) METHOD AND DEVICE FOR CONTROLLING INTER-CELL INTERFERENCE IN WIRELESS COMMUNICATION SYSTEM

(71) Applicant: Samsung Electronics Co., Ltd., Suwon-si (KR)

(72) Inventors: Euichang Jung, Suwon-si (KR); Youngrok Jang, Suwon-si (KR); Suha Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 453 days.

(21) Appl. No.: 18/325,485

(22) Filed: May 30, 2023

(65) Prior Publication Data

US 2023/0300839 A1 Sep. 21, 2023

Related U.S. Application Data

(63) Continuation of application No. PCT/KR2022/001845, filed on Feb. 7, 2022.

(30) Foreign Application Priority Data

Feb. 9, 2021 (KR) ........................ 10-2021-0018705

(51) Int. Cl.
*H04W 40/04* (2009.01)
*H04L 1/00* (2006.01)
(Continued)

(52) U.S. Cl.
CPC ....... *H04W 72/1273* (2013.01); *H04L 1/0067* (2013.01); *H04W 72/232* (2023.01)

(58) Field of Classification Search
CPC ............ H04W 72/1273; H04W 72/232; H04L 1/0067; H04L 1/08; H04L 5/0046;
(Continued)

(56) References Cited

U.S. PATENT DOCUMENTS 10,912,071 B2 2/2021 Panteleev et al.
12,063,172 B2 * 8/2024 Sun ......................... H04L 5/005
(Continued)

FOREIGN PATENT DOCUMENTS

EP 2922357 A1 9/2015
KR 20190095326 A 8/2019
(Continued)

OTHER PUBLICATIONS

Qualcomm, "CR on 38.214 PDSCH resource mapping", 3GPP TSG RAN WG1 Meeting #100bis, e-Meeting, R1-2002840, Apr. 25, 2020, 5 pages.
(Continued)

*Primary Examiner* — Hoang-Chuong Q Vu
(74) *Attorney, Agent, or Firm* — Nixon & Vanderhye, P.C.

(57) ABSTRACT

The present disclosure relates to a 5G or 6G communication system for supporting higher data transmission rates. An example method performed by a terminal in a communication system includes receiving, from a base station, configuration information on a rate matching pattern; receiving, from the base station, downlink control information (DCI) for scheduling a physical downlink shared channel (PDSCH) on a plurality of physical downlink control channels (PDCCHs); and performing rate matching according to the rate matching pattern corresponding to the plurality of PDSCHs based on the configuration information in a case that the plurality of PDSCHs is scheduled based on the DCI.

15 Claims, 16 Drawing Sheets

(51) Int. Cl.
*H04W 72/1273* (2023.01)
*H04W 72/232* (2023.01)

(58) Field of Classification Search
CPC ... H04L 5/0053; H04L 5/0094; H04L 1/0013; H04L 5/0044; H04L 5/0073; H04J 11/005
See application file for complete search history.

(56) References Cited

U.S. PATENT DOCUMENTS

2012/0329400 A1* 12/2012 Seo .................... H04W 72/23 455/63.1
2015/0180625 A1* 6/2015 Park .................... H04B 7/024 370/329
2015/0195068 A1 7/2015 Kim et al.
2015/0249974 A1* 9/2015 Lee .................... H04W 72/0446 370/329
2015/0280883 A1 10/2015 Seo et al.
2016/0105882 A1 4/2016 Park et al.
2019/0150164 A1 5/2019 Nam et al.
2019/0342030 A1 11/2019 Hosseini et al.
2020/0014481 A1 1/2020 Chervyakov et al.
2020/0067676 A1 2/2020 Yi
2020/0112417 A1 4/2020 Park et al.
2020/0382247 A1* 12/2020 Kwak .................... H04L 1/0013
2020/0413412 A1 12/2020 Kim et al.
2021/0135791 A1 5/2021 Wang et al.
2022/0210662 A1* 6/2022 Wang .................... H04L 1/0069
2022/0217756 A1 7/2022 Wu et al.
2022/0312452 A1* 9/2022 Frenne .................... H04L 5/005
2023/0337233 A1* 10/2023 Zhou .................... H04L 5/0055
2024/0056828 A1* 2/2024 Gutierrez Gonzalez .................... H04W 16/14

FOREIGN PATENT DOCUMENTS

| | | | |
|---|---|---|---|
| KR | 20190098727 | A | 8/2019 |
| KR | 20190133042 | A | 11/2019 |
| KR | 20200001578 | A | 1/2020 |
| KR | 20200085760 | A | 7/2020 |
| KR | 20210001754 | A | 1/2021 |
| KR | 20210003130 | A | 1/2021 |
| WO | 2020235884 | A1 | 11/2020 |

OTHER PUBLICATIONS

International Search Report for PCT/KR2022/001845 mailed May 3, 2022, 3 pages.
Written Opinion of the ISA for PCT/KR2022/001845 mailed May 3, 2022, 4 pages.
Extended Search Report dated May 24, 2024 in European Patent Application No. 22752938.5.
Office Action dated Aug. 4, 2025 in Korean Patent Application No. 10-2021-0018705 and English-language translation.
Office Action mailed Apr. 3, 2026 in Korean Application No. 10-2021-0018705 with English translation.
Office Action dated Apr. 9, 2026 in European Application No. 22752938.5.

* cited by examiner

METHOD AND DEVICE FOR CONTROLLING INTER-CELL INTERFERENCE IN WIRELESS COMMUNICATION SYSTEM

CROSS-REFERENCE TO RELATED APPLICATIONS

This application is a continuation of International Application No. PCT/KR2022/001845, designating the United States, filed on Feb. 7, 2022, in the Korean Intellectual Property Receiving Office and claiming priority to Korean Patent Application No. 10-2021-0018705, filed Feb. 9, 2021, in the Korean Intellectual Property Office. The disclosures of each of these applications are incorporated by reference herein in their entireties.

BACKGROUND

Field

The disclosure relates to a wireless communication system, and, more particularly, to a method and a device for performing communication in a communication system including a plurality of cells.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands, referred to as mmWave, including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Meanwhile, for coexistence of long-term evolution (LTE) and new RAT (NR) (LTE-NR coexistence), the NR provides a function of configuring a pattern of a cell specific reference signal (CRS) of the LTE to an NR UE. A single-TRP setup UE may configure only one CRS pattern for one LTE carrier. Accordingly, in a multi-cell environment, if adjacent LTE cell(s) use(s) the CRS pattern that is different from that of a serving cell (LTE-NR coexistence cell) of the UE, the UE may suffer considerable interferences with the adjacent LTE cell(s). Although such problems of interferences with the UE may be reduced through an appropriate scheduling of a base station, the scheduling is performed in the unit of a resource block (RB), and the CRS is mapped in the unit of a resource element (RE), thereby causing limitations in reducing the interferences. The disclosure relates to this.

SUMMARY

An embodiment of the disclosure provides a device and a method capable of effectively providing services.

According to an example embodiment, a method performed by a terminal in a communication system may include receiving, from a base station, configuration information on a rate matching pattern; receiving, from the base station, downlink control information (DCI) for scheduling a physical downlink shared channel (PDSCH) on a plurality of physical downlink control channels (PDCCHs); and performing rate matching according to the rate matching pattern corresponding to plurality of PDSCHs based on the configuration information in case that the plurality of PDSCHs are scheduled based on the DCI.

According to an example embodiment, a method performed by a base station in a communication system may include transmitting, to a terminal, configuration information on a rate matching pattern; transmitting, to the terminal, downlink control information (DCI) for scheduling a physical downlink shared channel (PDSCH) on a plurality of physical downlink control channels (PDCCHs); and performing rate matching according to the rate matching pattern corresponding to plurality of PDSCHs based on the configuration information in case that the plurality of PDSCHs is scheduled based on the DCI.

According to an example embodiment, a UE in a communication system may include a transceiver; and a processor coupled with the transceiver and configured to: receive, from a base station, configuration information on rate matching patterns, receive, from the base station, downlink control information (DCI) for scheduling a physical downlink shared channel (PDSCH) on a plurality of physical downlink control channels (PDCCHs), and perform rate matching according to the rate matching patterns corresponding to plurality of PDSCHs, respectively, based on the configuration information in case that the plurality of PDSCHs are scheduled based on the DCI.

According to an example embodiment, a base station in a communication system includes a transceiver; and a processor coupled with the transceiver configured to: transmit, to a terminal, configuration information on a rate matching pattern; transmit, to the terminal, downlink control information (DCI) for scheduling a physical downlink shared channel (PDSCH) on a plurality of physical downlink control channels (PDCCHs); and perform rate matching according to the rate matching patterns corresponding to plurality of PDSCHs based on the configuration information in case that the plurality of PDSCHs is scheduled based on the DCI.

According to various example embodiments, services can be effectively provided in a wireless communication system in which NR and LTE networks coexist.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
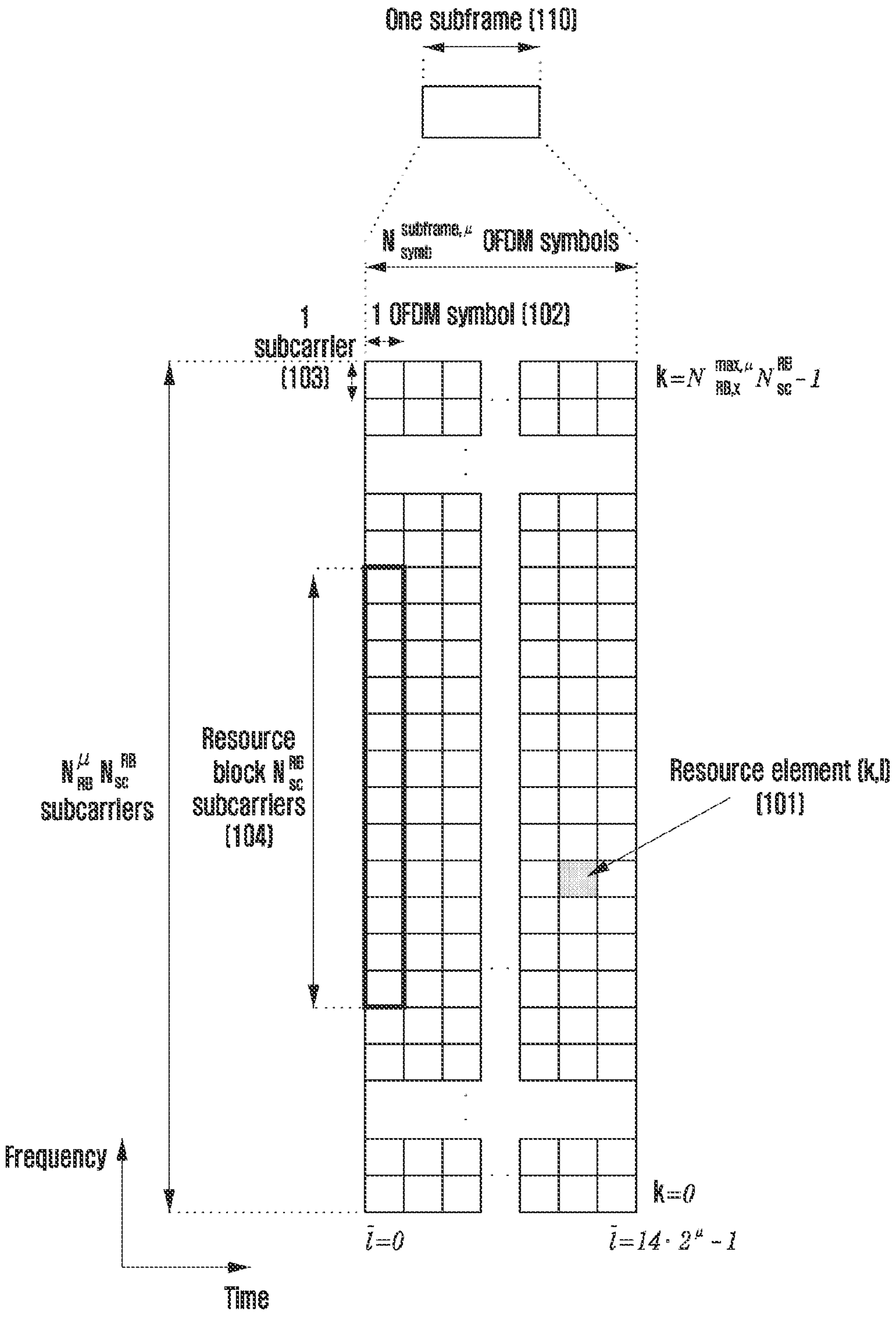
FIG. 1 is a diagram illustrating the base structure of a time-frequency domain that is a radio resource area in which data or a control channel is transmitted in a 5G system according to various embodiments.

Hereinafter, example embodiments of the disclosure will be described in detail with reference to the accompanying drawings.

In describing the example embodiments, explanation of technical contents that are well known in the technical field to which the disclosure pertains and are not directly related to the disclosure will be omitted. This is to convey the subject matter of the disclosure more clearly without obscuring the same.

For the same reason, in the accompanying drawings, some constituent elements are exaggerated, omitted, or briefly illustrated. Further, sizes of the respective constituent elements do not completely reflect the actual sizes thereof, and in the drawings, the same reference numerals may be used for the same or corresponding constituent elements across various figures.

The aspects and features of the disclosure and methods for achieving the aspects and features will be apparent by referring to the example embodiments to be described in detail with reference to the accompanying drawings. However, the disclosure is not limited to the example embodiments disclosed hereinafter, and the disclosure may be implemented in diverse forms. The example embodiments are provided to complete the disclosure and to completely notify those of ordinary skill in the art to which the disclosure pertains of the category of the disclosure, and the disclosure is only defined within the scope of the appended claims. In the entire description of the disclosure, the same reference numerals may be used for the same elements. Further, in describing the disclosure, a detailed description of a related function or configuration will be omitted if it is deemed to make the gist of the disclosure unnecessarily vague. Furthermore, terms to be described hereunder have been defined by taking into consideration functions in the disclosure, and may differ depending on a user, an operator's intention or practice. Accordingly, each term should be defined based on the contents over the entire specification.

Hereinafter, the base station may, for example, refer to an object that performs resource allocation to a UE, and may be at least one of gNode B, eNode B, Node B, base station (BS), radio access unit, base station controller, or node on a network. The UE may, for example, refer to user equipment (UE), mobile station (MS), cellular phone, smart phone, computer, or a multimedia system capable of performing a communication function. In the disclosure, the downlink (DL) may, for example, refer to a radio transmission path of a signal that the base station transmits to the UE, and the uplink (UL) may, for example, refer to a radio transmission path of a signal that the UE transmits to the base station. Hereinafter, although an LTE or LTE-A system may be described as an example, an embodiment of the disclosure may also be applied to other communication systems having similar technical backgrounds or channel types. For example, the fifth generation mobile communication technology (5G, new radio, or NR) developed after the LTE-A may be included therein, and hereinafter, the 5G may, for example, refer to a concept that includes the existing LTE, LTE-A, and other similar services. Further, the disclosure may also be applied to other communication systems through partial modifications thereof.

In this case, it will be understood that each block of the flowchart illustrations, and combinations of blocks in the flowchart illustrations, can be performed by computer program instructions. These computer program instructions can be loaded to a processor of a general purpose computer, special purpose computer, or other programmable data processing apparatus, such that the instructions, which are executed via the processor of the computer or other programmable data processing apparatus, create means for implementing the functions specified in the flowchart block or blocks. These computer program instructions may also be stored in a non-transitory computer usable or computer-readable memory that can direct a computer or other programmable data processing apparatus to function in a particular manner, such that the instructions stored in the computer usable or computer-readable memory can produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions which are executed on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur in a different order or simultaneously or substantially simultaneously. For example, two blocks shown in succession may in fact be executed substantially concurrently or the blocks may sometimes be executed in the reverse order, depending upon the functionality involved.

The term "~unit", as used in an embodiment, may, for example, refer to a software or hardware component, or a combination thereof, such as a field programmable gate array (FPGA) or an application specific integrated circuit (ASIC), and performs certain tasks. However, "~unit" is not meant to be limited to software or hardware. The term "~unit" may be configured to reside on the addressable storage medium and configured to operate one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may, for example, be implemented to operate one or more CPUs in a device or a security multimedia card. Further, in an embodiment, the "~units" may include one or more processors.

A wireless communication system was initially developed for the purpose of providing a voice-oriented service, but has been expanded to, for example, a broadband wireless communication system that provides a high-speed and high-quality packet data service like communication standards, such as 3GPP high speed packet access (HSPA), long term evolution (LTE) or evolved universal terrestrial radio access (E-UTRA), LTE-Advanced (LTE-A), LTE-Pro, 3GPP2 high rate packet data (HRPD), ultra mobile broadband (UMB), and IEEE 802.16e.

In the LTE system, which is a representative example of a broadband wireless communication system, a downlink (DL) adopts an orthogonal frequency division multiplexing (OFDM) scheme, and an uplink (UL) adopts a single carrier frequency division multiple access (SC-FDMA) scheme. The uplink refers, for example, to a radio link in which a user equipment (UE) or a mobile station (MS) transmits data or a control signal to a base station (eNode B or BS), and the downlink refers, for example, to a radio link in which the base station transmits data or a control signal to the UE. According to the above-described multiple access schemes, generally, data or control information for each user may be discriminated from each other by performing an allocation and an operation so as to prevent the time-frequency resources for carrying the data or control information for each user from overlapping each other, that is, to establish orthogonality.

In the 5G communication system that is beyond the LTE, since it is necessary to freely reflect various requirements of users and service providers, services simultaneously satisfying the various requirements should be supported. Services being considered for the 5G communication system may be enhanced mobile broadband (eMBB), massive machine type communication (mMTC), and ultra-reliability low-latency communication (URLLC).

The eMBB service may, for example, aim at providing a more improved data rate than the data rate supported by the existing LTE, LTE-A, or LTE-Pro. For example, in the 5G communication system, it is required that, from the viewpoint of one base station, the eMBB service provides a peak data rate of 20 Gbps on the downlink and a peak data rate of 10 Gbps on the uplink. Further, the 5G communication system should provide a user perceived data rate of increased UEs simultaneously with providing the peak data rate. In order to satisfy such requirements, improvement of various transmission/reception technologies including more improved multi input multi output (MIMO) transmission technology is required. Further, in the 5G system, it becomes possible to satisfy the data rate required in the 5G communication system using a frequency bandwidth that is wider than 20 MHz in the frequency band of 3 to 6 GHz or 6 GHz or more, whereas in the LTE, signal transmission is performed using the maximum transmission bandwidth of 20 MHz in the 2 GHz band used in the LTE.

At the same time, in order to support application services, such as Internet of things (IoT), in the 5G communication system, the mMTC service is under consideration. In order to efficiently provide the Internet of things in the mMTC service, massive UE access support, UE coverage improvement, improved battery time, and UE cost reduction are required in a cell. Since the Internet of things is attached to various sensors and appliances to provide communication functions, it should support a large number of UEs (e.g., 1,000,000 UEs/km$^2$) in the cell. Further, since there is a high possibility that a UE supporting the mMTC service is located in a shaded area that is unable to be covered by the cell, such as underground of a building, due to the characteristics of the service, a wider coverage is demanded as compared with other services being provided by the 5G communication system. The UE supporting the mMTC service should be configured as an inexpensive UE, and since it is difficult to frequently replace a battery of the UE, a very long battery life time, such as 10 to 15 years, may be required.

Last, the URLLC service is a cellular-based wireless communication service that is used for a specific purpose (mission-critical). For example, services used for remote control of a robot or machinery, industrial automation, unmanned aerial vehicle, remote health care, and emergency alert may be considered. Accordingly, the communication being provided by the URLLC service should provide a very low latency and a very high reliability. For example, a service supporting URLLC should satisfy an air interface latency that is shorter than 0.5 milliseconds and have packet error rate requirements of 10-5 or less at the same time. Accordingly, for a service supporting URLLC, the 5G system should provide a transmit time interval (TTI) that is shorter than that of other services, and it may require design matters to allocate wide resources in the frequency band in order to secure reliability of a communication link at the same time.

Three kinds of services in the 5G, that is, the eMBB, URLLC, and mMTC may be multiplexed and transmitted by one system. In this case, in order to satisfy different requirements of the respective services, different transmission/reception techniques and transmission/reception parameters may be used between the services. Of course, the 5G is not limited to the above-described services.

Hereinafter, a frame structure of a 5G system will be described in more detail with reference to the drawings.

FIG. 1 is a diagram illustrating the base structure of a time-frequency domain that is a radio resource area in which data or a control channel is transmitted in a 5G system according to various embodiments.

In FIG. 1, a horizontal axis represents a time domain, and a vertical axis represents a frequency domain. In the time and frequency domains, the base unit of resources is a resource element (RE) 101, which may be defined as one orthogonal frequency division multiplexing (OFDM) symbol 102 on a time axis and as one subcarrier 103 on a frequency axis. In the frequency domain, $$N_{SC}^{RB}$$

(e.g., 12) successive REs may constitute one resource block (RB) 104.

Figure 2:
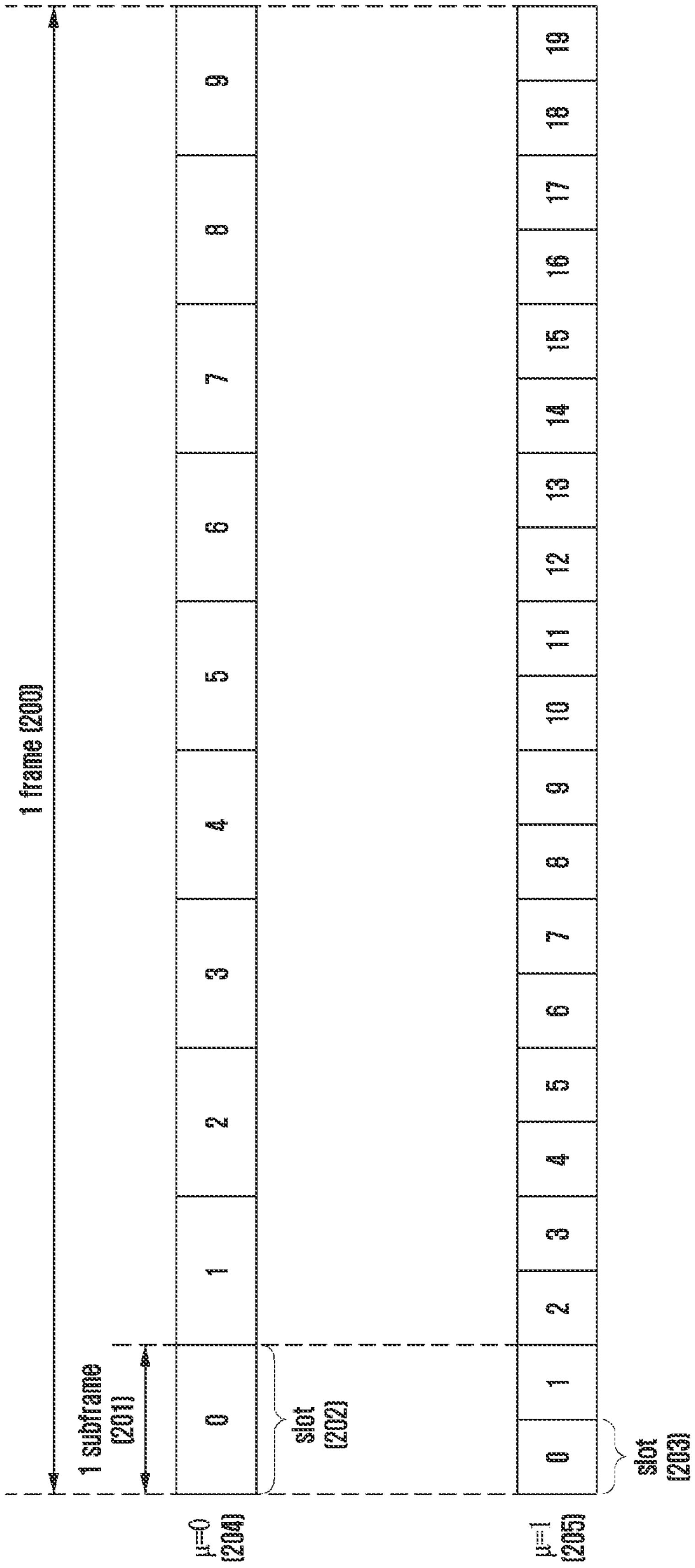
FIG. 2 is a diagram illustrating an example of a slot structure that is considered in a 5G system according to various embodiments.

FIG. 2 is a diagram illustrating an example of a slot structure that is considered in a 5G system according to various embodiments.

FIG. 2 illustrates an example of structures of a frame 200, a subframe 201, and a slot 202. One frame 200 may be defined as 10 ms. One subframe 201 may be defined as 1 ms, and thus one frame 200 may be composed of 10 subframes 201 in total. One slot 202 or 203 may be defined as 14 OFDM symbols (i.e., the number of symbols $$N_{symb}^{slot}$$

for one slot=14). The subframe 201 may be composed of one or a plurality of slots 202 and 203, and the number of slots 202 and 203 for one subframe 201 may differ depending on a configuration value μ (204 or 205) for subcarrier spacing. In an example of FIG. 2, cases in which the configuration value μ for the subcarrier spacing satisfy μ=0 (204) and μ=1 (205) are illustrated. In case of μ=0 (204), one subframe 201 may be composed of one slot 202, whereas in case of μ=1 (205), one subframe 201 may be composed of two slots 203. That is, the number of slots $$N_{slot}^{subframe,\mu}$$

for one subframe may differ depending on the configuration value μ for the subcarrier spacing, and thus the number of slots $$N_{slot}^{frame,\mu}$$

for one frame may also differ. The numbers $$N_{slot}^{subframe,\mu} \text{ and } N_{slot}^{frame,\mu}$$

in accordance with the configuration value μ for each subcarrier spacing may be defined as in Table 1 below.

TABLE 1

| μ | $N_{symb}^{slot}$ | $N_{slot}^{frame\mu}$ | $N_{slot}^{subframe\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, bandwidth part (BWP) configuration in a 5G communication system will be described in detail with reference to FIG. 3.

Figure 3:
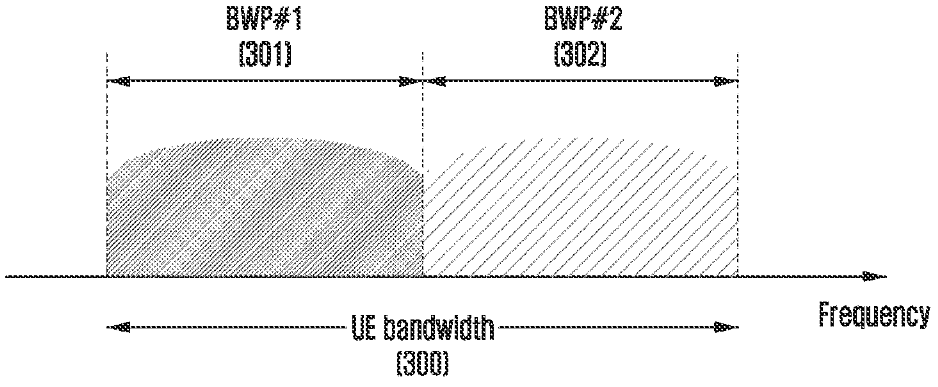
FIG. 3 is a diagram illustrating an example of a configuration for a bandwidth part in a 5G communication system according to various embodiments.

FIG. 3 is a diagram illustrating an example of bandwidth part configuration in a 5G communication system according to various embodiments.

FIG. 3 shows an example in which a UE bandwidth 300 is configured to include two bandwidth parts, that is, bandwidth part #1 (BWP #1) 301 and bandwidth part #2 (BWP #2) 302. A base station may configure one or a plurality of bandwidth parts for the UE, and may configure following information with respect to the respective bandwidth parts.

TABLE 2

```
BWP ::=                        SEQUENCE {
  bwp-Id                          BWP-Id,
  locationAndBandwidth         INTEGER (1..65536),
  subcarrierSpacing               ENUMERATED {n0, n1, n2,
n3, n4, n5
  cyclicPrefix                    ENUMERATED { extended }
}
```

The configuration method for bandwidth parts is not limited to that above example, and in addition to the configuration information as described above, various parameters related to the bandwidth parts may be configured for the UE. The above-described information may be transferred from the base station to the UE through upper layer signaling, for example, radio resource control (RRC) signaling. One configured bandwidth part or at least one of a plurality of bandwidth parts may be activated. Whether to activate the configured bandwidth part may be semi-statically transferred from the base station to the UE through the RRC signaling, or may be dynamically transferred through downlink control information (DCI).

According to an embodiment, the UE before being RRC-connected may receive configuration information on an initial bandwidth part (initial BWP) for an initial connection from the base station through a master information block (MIB). More specifically, the UE, at an initial connection step, may receive configuration information on a control resource set (CORESET) and search spaces capable of transmitting DCI including scheduling information for receiving system information (which may correspond to remaining system information (RMSI) or system information block 1 (SIB1)) that is necessary for the initial connection through the MIB. The bandwidth of the control resource set configured through the MIB may be considered as the initial bandwidth part, and the UE may receive a physical downlink shared channel (PDSCH) on which the SIB is transmitted through the configured initial bandwidth part. In addition to the purpose of receiving the SIB, the initial bandwidth part may be utilized for other system information (OSI), paging, and random access. Further, respective identities (IDs) for the control resource set and the search space being configured through the MIB may be considered as 0. The base station may notify the UE of configuration information including at least one of frequency allocation information on a control resource set #0, time allocation information, and numerology information through the MIB. Further, the base station may notify the UE of configuration information on a monitoring period and occasion for the control resource set #0, that is, configuration information on a search space #0 through the MIB. The UE may consider the frequency domain configured as the control resource set #0 acquired from the MIB as the initial bandwidth part for the initial connection. In this case, the identity (ID) of the initial bandwidth part may be considered as 0.

The configuration of the bandwidth parts supported in the 5G may be used for various purposes.

In various embodiments, if the bandwidth supported by the UE is less than the system bandwidth, this may be supported through the bandwidth part configuration. For example, since the base station configures a frequency location (configuration information 2) of a bandwidth part to the UE, the UE can transmit and receive data at a specific frequency location in the system bandwidth.

Further, in various embodiments, the base station may configure a plurality of bandwidth parts to the UE for the purpose of supporting different numerologies. For example, in order to support data transmission and reception using both a subcarrier spacing of 15 kHz and a subcarrier spacing of 30 kHz to a certain UE, two bandwidth parts may be configured as subcarrier spacing of 15 kHz and 30 kHz, respectively. The different bandwidth parts may be frequency-division-multiplexed, and, in a case of transmitting and receiving the data with specific subcarrier spacing, the bandwidth part that is configured with the corresponding subcarrier spacing may be activated.

Further, in various embodiments, the base station may configure bandwidth parts having bandwidths of different sizes to the UE for the purpose of reducing power consumption of the UE. For example, if the UE supports a very high bandwidth, for example, a bandwidth of 100 MHz, and it transmits and receives data always with the corresponding bandwidth, this may cause very high power consumption. In particular, from the viewpoint of power consumption, it is very inefficient to perform monitoring of unnecessary downlink control channels with the high bandwidth of 100 MHz in a situation in which no traffic exists. For the purpose of reducing the power consumption of the UE, the base station may configure a bandwidth part having a relatively low bandwidth, for example, a bandwidth part of 20 MHz, to the UE. In the situation of no traffic, the UE may perform a monitoring operation in the bandwidth part of 20 MHz, and, in a case of data occurrence, the UE may transmit and receive data with the bandwidth part of 100 MHz in accordance with instructions of the base station. Next, a synchronization signal (SS)/PBCH block in 5G will be described.

The SS/PBCH block may, for example, refer to a physical layer channel block composed of a primary SS (PSS), a secondary SS (SSS), and a PBCH. The details thereof are as follows.

PSS: This is a reference signal of downlink time/frequency synchronization, and it provides partial information of a cell ID.

SSS: This is a reference signal of downlink time/frequency synchronization, and it provides remaining cell ID information that is not provided by the PSS. In addition, the SSS may serve as a reference signal for demodulating the PBCH.

PBCH: This provides essential system information necessary for transmission/reception of a data channel and a control channel of the UE. The essential system information may include search space related control information indicating radio resource mapping information of the control channel and scheduling control information on a separate data channel for transmitting the system information.

SS/PBCH block: An SS/PBCH block is composed of a combination of the PSS, SSS, and PBCH. One or a plurality of SS/PBCH blocks may be transmitted within a time of 5 ms, and the respective SS/PBCH blocks may be discriminated from each other by indexes.

At an initial connection stage, the UE may detect the PSS and the SSS, and it may decode the PBCH.

The UE may acquire the MIB from the PBCH, and it may be configured with a control resource set (CORESET) #0 (this may correspond to the control resource set having the control resource set index of 0) from the acquired MIB. The UE may perform monitoring of the control resource set #0 under the assumption that demodulation reference signals (DMRS) that are transmitted from the selected SS/PBCH block and the control resource set #0 are quasi co-located (QCL) with each other. The UE may receive the system information based on the downlink control information transmitted from the control resource set #0. The UE may acquire configuration information related to a random access channel (RACH) that is necessary for the initial connection from the received system information. The UE may transmit a physical RACH (PRACH) to the base station in consideration of the SS/PBCH index selected by the UE itself, and the base station, having received the PRACH, may acquire information on the SS/PBCH block index selected by the UE from the received PRACH. The base station may identify which of the SS/PBCH blocks the UE selects, and may be aware of the fact whether the UE monitors the control resource set #0 related to the selected block.

Next, downlink control information (DCI) in a 5G system will be described in detail.

In the 5G system, scheduling information on uplink data (or physical uplink shared channel (PUSCH)) or downlink data (or physical downlink shared channel (PDSCH)) may be transferred from the base station to the UE through the DCI. The UE may monitor a fallback DCI format and a non-fallback DCI format with respect to the PUSCH or PDSCH. The fallback DCI format may include a fixed field predefined between the base station and the UE, and the non-fallback DCI format may include a configurable field.

The DCI may be transmitted on a physical downlink control channel (PDCCH) through a channel coding and modulation process. A cyclic redundancy check (CRC) is attached to a DCI message payload, and the CRC is scrambled by a radio network temporary identifier (RNTI) corresponding to the identity of the UE. Different RNTIs may be used in accordance with the purpose of a DCI message, for example, in accordance with a UE-specific data transmission, a power control command, or a random access response. That is, the RNTI is not transmitted explicitly, but is included in a CRC computation process to be transmitted. In a case of receiving the DCI message being transmitted on the PDCCH, the UE identifies the CRC using the assigned RNTI, and, if the result of identifying the CRC is correct, the UE can be aware that the corresponding message has been transmitted to the UE.

For example, the DCI scheduling the PDSCH on the system information (SI) may be scrambled by an SI-RNTI. The DCI scheduling the PDSCH on a random access response (RAR) message may be scrambled by a RA-RNTI. The DCI scheduling the PDSCH on a paging message may be scrambled by a P-RNTI. The DCI notifying a slot format indicator (SFI) may be scrambled by an SFI-RNTI. The DCI notifying a transmit power control (TPC) may be scrambled by a TPC-RNTI. The DCI scheduling the UE-specific PDSCH or PUSCH may be scrambled by a cell RNTI (C-RNTI).

DCI format 0_0 may be used as a fallback DCI scheduling the PUSCH, and in this case, the CRC may be scrambled by the C-RNTI. The DCI format 0_0 in which the CRC is scrambled by the C-RNTI may include, for example, the following information.

TABLE 3

Identifier for DCI formats– 1 bit

The value of this bit field is always set to 0, indicating an UL DCI format

Frequency domain resource assignment – $\lceil \log_2(N_{RB}^{UL,BWP}(N_{RB}^{UL,BWP}+1)/2) \rceil$ bits where $N_{RB}^{UL,BWP}$ is defined in subclause 7.3.1.0

For PUSCH hopping with resource allocation type 1:

$N_{UL\_hop}$ MSB bits are used to indicate the frequency offset according to Subclause 6.3 of [6, TS 38.214], where $N_{UL\_hop}$ =1 if the higher layer parameter frequencyHoppingOffsetLists contains two offset values and $N_{UL\_hop}$ = 2 if the higher layer parameter frequencyHoppingOffsetLists contains four offset values $\lceil \log_2(N_{RB}^{UL,BWP}(N_{RB}^{UL,BWP}+1)/2 \rceil - N_{UL\_hop}$ bits provides the frequency domain resource allocation according to Subclause 6.1.2.2.2 of [6, TS 38.214]

TABLE 3-continued

| |
|---|
| For non-PUSCH hopping with resource allocation type 1: |
| $\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214] |
| Time domain resource assignment – 4 bits as defined in Subclause 6.1.2.1 of [6, TS 38.214] |
| Frequency hopping flag– 1 bit according to Table 7.3.1.1.1-3, as defined in Subclause 6.3 of [6, TS 38.214] |
| Modulation and coding scheme– 5 bits as defined in Subclause 6.1.4.1 of [6, TS 38.214] |
| New data indicator – 1 bit |
| Redundancy version – 2 bits as defined in Table 7.3.1.1.1-2 |
| HARQ process number – 4 bits |
| TPC command for scheduled PUSCH – 2 bits as defined in Subclause 7.1.1 of [5, TS 38.213] |
| Padding bits, if required. |
| UL SUL indicator (상향링크/추가적인 상향링크(Supplementary UL) 지시자)– 1 bit for UEs configured with supplementaryUplinkin ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s). |
| If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured; |
| If the UL/SUL indicator is not present in DCI format 0_0 and pucch-Config is configured, the corresponding PUSCH scheduled by the DCI format 0_0 is for the UL or SUL for which high layer parameter pucch-Config is configured. |
| If the UL/SUL indicator is not present in DCI format 0_0 and pucch-Config is not configured, the corresponding PUSCH scheduled by the DCI format 0_0 is for the uplink on which the latest PRACH is transmitted. |
| UL/SUL indicator – 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s). |
| If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured; |
| If the UL/SUL indicator is not present in DCI format 0_0 and pucch-Config is configured, the corresponding PUSCH scheduled by the DCI format 0_0 is for the UL or SUL for which high layer parameter pucch-Config is configured. |
| If the UL/SUL indicator is not present in DCI format 0_0 and pucch-Config is not configured, the corresponding PUSCH scheduled by the DCI format 0_0 is for the uplink on which the latest PRACH is transmitted. |

DCI format 0_1 may be used as a non-fallback DCI scheduling the PUSCH, and, in this case, the CRC may be scrambled by the C-RNTI. The DCI format 0_1 in which the CRC is scrambled by the C-RNTI may include, for example, the following information.

TABLE 4

| |
|---|
| Identifier for DCI formats - 1 bit |
| The value of this bit field is always set to 0, indicating an UL DCI format |
| Carrier indicator - 0 or 3 bits, as defined in Subclause 10.1 of [5, TS38.213]. |
| UL/SUL indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1. |
| Bandwidth part indicator - 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where |
| $n_{BWP} = n_{BWP,RRC} + 1$ if $n_{BWP,RRC} \leq 3$, in which case the bandwidth part indicator is equivalent to the ascending order of the higher layer parameter BWP-Id; |
| otherwise $n_{BWP} = n_{BWP,RRC}$, in which case the bandwidth part indicator is defined in Table 7.3.1.1.2-1; |
| If a UE does not support active BWP change via DCI, the UE ignores this bit field. |
| Frequency domain resource assignment - number of bits determined by the following, where $N_{RB}^{UL,BWP}$ is the size of the active UL bandwidth part: |
| $N_{RBG}$ bits if only resource allocation type 0 is configured, where $N_{RBG}$ is defined in Subclause 6.1.2.2.1 of [6, TS 38.214], |

TABLE 4-continued $\lceil \log_2(N_{RB}^{UL,BWP}(N_{RB}^{UL,BWP}+1)/2) \rceil$ bits if only resource allocation type 1 is configured, or $\max(\lceil \log_2(N_{RB}^{UL,BWP}(N_{RB}^{UL,BWP}+1)/2) \rceil + 1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Subclause 6.1.2.2.1 of [6, TS 38.214].

For resource allocation type 1, the $\lceil \log_2(N_{RB}^{UL,BWP}(N_{RB}^{UL,BWP}+1)/2 \rceil$ LSBs provide the resource allocation as follows:

For PUSCH hopping with resource allocation type 1:

$N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values $\lceil \log_2(N_{RB}^{UL,BWP}(N_{RB}^{UL,BWP}+1)/2 \rceil$ - $N_{UL\_hop}$ bits provides the frequency domain resource allocation according to Subclause 3.1.2.2.2 of [6, TS 38.214]

For non-PUSCH hopping with resource allocation type 1:

$\lceil \log_2(N_{RB}^{UL,BWP}(N_{RB}^{UL,BWP}+1)/2 \rceil$ bits provides the frequency domain resource allocation according to Subclause 6.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment - 0, 1, 2, 3, or 4 bits as defined in Subclause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.

Frequency hopping flag - 0 or 1 bit:

0 bit if only resource allocation type 0 is configured or if the higher layer parameter frequencyHopping is not configured;

1 bit according to Table 7.3.1.1.1-3 otherwise, only applicable to resource allocation type 1, as defined in Subclause 6.3 of [6, TS 38.214].

Modulation and coding scheme - 5 bits as defined in Subclause 6.1.4.1 of [6, TS 38.214]

New data indicator - 1 bit

Redundancy version - 2 bits as defined in Table 7.3.1.1.1-2

HARQ process numbe - 4 bits

1st downlink assignment index - 1 or 2 bits:

1 bit for semi-static HARQ-ACK codebook;

2 bits for dynamic HARQ-ACK codebook.

2nd downlink assignment index - 0 or 2 bits:

2 bits for dynamic HARQ-ACK codebook with two HARQ-ACK sub-codebooks;

0 bit otherwise.

TPC command for scheduled PUSCH - 2 bits as defined in Subclause 7.1.1 of [5, TS38.213]

$$\left\lceil \log_2\left(\sum_{k=1}^{min\{LSRS_{max}\{\ \}\}\Sigma}\binom{N_{SRS}}{k}0\right)-- \right\rceil$$

where $N_{SRS}$ is the number of configured SRS resources in the SRS resource set associated with the higher layer parameter usage of value 'codeBook' or 'nonCodeBook', $$\left\lceil \log_2\left(\sum_{k=1}^{min\{LSRS_{max}\{\ \}\}\Sigma}\binom{N_{SRS}}{k}0\right)\frac{-}{-} \right\rceil$$

the higher layer parameter txConfig = nonCodebook, where $N_{SRS}$ is the number of configured SRS resources in the SRS resource set associated with the higher layer parameter usage of value 'nonCodeBook' and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

TABLE 4-continued

| |
|---|
| $\lceil \log_2(N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'. |
| Precoding information and number of layers - number of bits determined by the following: |
| 0 bits if the higher layer parameter txConfig = nonCodeBook; |
| 0 bits for 1 antenna port and if the higher layer parameter txConfig = codebook; |
| 4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset; |
| 2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset; |
| 2 or 4 bits according to Table 7.3.1.1.2-4 for 2 antenna ports, if txConfig = codebook, and according to whether transform precoder is enabled or disabled, and the values of higher layer parameters maxRank and codebookSubset; |
| 1 or 3 bits according to Table 7.3.1.1.2-5 for 2 antenna ports, if txConfig = codebook, and according to whether transform precoder is enabled or disabled, and the values of higher layer parameters maxRank and codebookSubset. |
| Antenna ports (안테나 포트) - number of bits determined by the following |
| 2 bits as defined by Tables 7.3.1.1.2-6, if transform precoder is enabled, dmrs-Type = 1, and maxLength = 1; |
| 4 bits as defined by Tables 7.3.1.1.2-7, if transform precoder is enabled, dmrs-Type = 1, and maxLength = 2; |
| 3 bits as defined by Tables 7.3.1.1.2-8/9/10/11, if transform precoder is disabled, dmrs-Type=1, and maxLength = 1, and the value of rank is determined according to the SRS resource indicator field if the higher layer parameter txConfig = nonCodebook and according to the Precoding information and number of layers field if the higher layer parameter txConfig = codebook; |
| 4 bits as defined by Tables 7.3.1.1.2-12/13/14/15, if transform precoder is disabled, dmrs-Type = 1, and maxLength = 2, and the value of rank is determined according to the SRS resource indicator field if the higher layer parameter txConfig = nonCodebook and according to the Precoding information and number of layers field if the higher layer parameter txConfig = codebook; |
| 4 bits as defined by Tables 7.3.1.1.2-16/17/18/19, if transform precoder is disabled, dmrs-Type = 2, and maxLength = 1, and the value of rank is determined according to the SRS resource indicator field if the higher layer parameter txConfig = nonCodebook and according to the Precoding information and number of layers field if the higher layer parameter txConfig = codebook; |
| 5 bits as defined by Tables 7.3.1.1.2-20/21/22/23, if transform precoder is disabled, dmrs-Type = 2, and maxLength = 2, and the value of rank is determined according to the SRS resource indicator field if the higher layer parameter txConfig = nonCodebook and according to the Precoding information and number of layers field if the higher layer parameter txConfig = codebook. |
| where the number of CDM groups without data of values 1, 2, and 3 in Tables 7.3.1.1.2-6 to 7.3.1.1.2-23 refers to CDM groups {0}, {0, 1}, and {0, 1, 2} respectively. |
| If a UE is configured with both dmrs-UplinkForPUSCH-MappingTypeA and dmrs-UplinkForPUSCH-MappingTypeB, the bitwidth of this field equals max$\{x_A, x_B\}$, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $\lvert x_A - x_B \rvert$ zeros are padded in the MSB of this field, if the mapping type of the PUSCH corresponds to the smaller value of $x_A$ and $x_B$. |
| SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214]. |
| CSI request - 0, 1, 2, 3, 4, 5, or 6 bits determined by higher layer parameter reportTriggerSize. |
| CBG transmission information (CBGTI) (코드 블록 그룹 (Code Block Group; CBG) 전송 정보) - 0 bit if higher layer parameter codeBlockGroupTransmission for PDSCH is not configured, otherwise, 2, 4, 6, or 8 bits determined by higher layer parameter maxCodeBlockGroupsPerTransportBlock for PUSCH. |
| PTRS-DMRS association - number of bits determined as follows |
| 0 bit if PTRS-UplinkConfig is not configured and transform precoder is disabled, or if transform precoder is enabled, or if maxRank = 1; |
| 2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field. |
| If "Bandwidth part indicator" field indicates a bandwidth part other than the active bandwidth part and the "PTRS-DMRS association" field is present for the indicated bandwidth part but not present for the active bandwidth part, the UE assumes the "PTRS-DMRS association" field is not present for the indicated bandwidth part. |
| beta_offset indicator - 0 if the higher layer parameter betaOffsets = semiStatic; otherwise 2 bits as defined by Table 9.3-3 in [5, TS 38.213]. |
| DMRS sequence initialization – 0 bit if transform precoder is enabled; 1 bit if transform precoder is disabled. |

TABLE 4-continued

| |
|---|
| UL-SCH indicator - 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s). |

DCI format 1_0 may be used as a fallback DCI scheduling the PDSCH, and, in this case, the CRC may be scrambled by the C-RNTI. The DCI format 1_0 in which the CRC is scrambled by the C-RNTI may include, for example, the following information.

TABLE 5

Identifier for DCI formats – 1 bits
The value of this bit field is always set to 1, indicating a DL DCI format Frequency domain resource assignment – $\lceil \log_2(N_{RB}^{DL,BWP}(N_{RB}^{DL,BWP}+1)/2) \rceil$ bits where $N_{RB}^{DL,BWP}$ is given by subclause 7.3.1.0

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:
Random Access Preamble index – 6 bits according to ra-PreambleIndex in Subclause 5.1.2 of [8, TS38.321]
UL/SUL indicator – 1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved
SS/PBCH index – 6 bits. If the value of the "Random Access Preamble index" is not all zeros, this field indicates the SS/PBCH that shall be used to determine the RACH occasion for the PRACH transmission; otherwise, this field is reserved.
PRACH Mask index – 4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved
Reserved bits – 10 bits
Otherwise, all remaining fields are set as follows:
Time domain resource assignment – 4 bits as defined in Subclause 5.1.2.1 of [6, TS 38.214]
VRB-to-PRB mapping – 1 bit according to Table 7.3.1.2.2-5
Modulation and coding scheme – 5 bits as defined in Subclause 5.1.3 of [6, TS 38.214]
New data indicator – 1 bit
Redundancy version – 2 bits as defined in Table 7.3.1.1.1-2
HARQ process number – 4 bits
Downlink assignment index – 2 bits as defined in Subclause 9.1.3 of [5, TS 38.213], as counter DAI
TPC command for scheduled PUCCH – 2 bits as defined in Subclause 7.2.1 of [5, TS 38.213]
PUCCH resource indicator – 3 bits as defined in Subclause 9.2.3 of [5, TS 38.213]
PDSCH-to-HARQ_feedback timing indicator – 3 bits as defined in Subclause 9.2.3 of [5, TS38.213]

DCI format 1_1 may be used as a non-fallback DCI scheduling the PDSCH, and, in this case, the CRC may be scrambled by the C-RNTI. The DCI format 1_1 in which the CRC is scrambled by the C-RNTI may include, for example, the following information.

TABLE 6

Identifier for DCI formats – 1 bits

The value of this bit field is always set to 1, indicating a DL DCI format

Carrier indicator – 0 or 3 bits as defined in Subclause 10.1 of [5, TS 38.213].

Bandwidth part indicator – 0, 1 or 2 bits as determined by the number of DL BWPS $n_{BWP,RRC}$ configured by higher layers, excluding the initial DL bandwidth part. The bitwidth for this field is determined as $\lceil \log_2(n_{BWP}) \rceil$ bits, where $n_{BWP} = n_{BWP,RRC} + 1$ if $n_{BWP,RRC} \leq 3$, in which case the bandwidth part indicator is equivalent to the ascending order of the higher layer parameter BWP-Id;

TABLE 6-continued otherwise $n_{BWP} = n_{BWP,RRC}$, in which case the bandwidth part indicator is defined in Table 7.3.1.1.2-1;

If a UE does not support active BWP change via DCI, the UE ignores this bit field.

Frequency domain resource assignment – number of bits determined by the following, where $N_{RB}^{DL,BWP}$ is the size of the active DL bandwidth part:

$N_{RBG}$ bits if only resource allocation type 0 is configured, where $N_{RBG}$ is defined in Subclause 5.1.2.2.1 of [6, TS38.214], $\lceil \log_2(N_{RB}^{DL,BWP}(N_{RB}^{DL,BWP}+1)/2 \rceil$ bits if only resource allocation type 1 is configured, or $\max(\lceil \log_2(N_{RB}^{DL,BWP}(N_{RB}^{DL,BWP}+1)/2 \rceil, N_{RBG})+1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Subclause 5.1.2.2.1 of [6, TS 38.214]. LSBs provide the resource For resource allocation type 1, the $\lceil \log_2(N_{RB}^{DL,BWP}(N_{RB}^{DL,BWP}+1)/2 \rceil$ LSBs provide the resource allocation as defined in Subclause 5.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment – 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise 1 is the number of entries in the default table.

VRB-to-PRB mapping – 0 or 1 bit:

0 bit if only resource allocation type 0 is configured or if interleaved VRB-to-PRB mapping is not configured by high layers;

1 bit according to Table 7.3.1.2.2-5 otherwise, only applicable to resource allocation type 1, as defined in Subclause 7.3.1.6 of [4, TS 38.211].

PRB bundling size indicator – 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].

Rate matching indicator– 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.

ZP CSI-RS trigger – 0, 1, or 2 bits as defined in Subclause 5.1.4.2 of [6, TS 38.214]. The bitwidth for this field is determined as $[\lceil \log_2(n_{ZP}+1) \rceil]$ bits, where $n_{ZP}$ is the number of aperiodic ZP CSI-RS resource sets configured by higher layer.

For transport block 1:

Modulation and coding scheme – 5 bits as defined in Subclause 5.1.3.1 of [6, TS 38.214]

New data indicator – 1 bit

Redundancy version – 2 bits as defined in Table 7.3.1.1.1-2

For transport block 2 (only present if maxNrofCode WordsScheduledByDCI equals 2):

Modulation and coding scheme – 5 bits as defined in Subclause 5.1.3.1 of [6, TS 38.214]

New data indicator – 1 bit

Redundancy version – 2 bits as defined in Table 7.3.1.1.1-2

If "Bandwidth part indicator" field indicates a bandwidth part other than the active bandwidth part and the value of maxNrofCode WordsScheduledByDCI for the indicated bandwidth part equals 2 and the value of maxNrofCode WordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.

HARQ process number – 4 bits

Downlink assignment index– number of bits as defined in the following 4 bits if more than one serving cell are configured in the DL and the higher layer parameter pdsch-HARQ-ACK-Codebook=dynamic, where the 2 MSB bits are the counter DAI and the 2 LSB bits are the total DAI;

2 bits if only one serving cell is configured in the DL and the higher layer parameter pdsch-HARQ-ACK-Codebook=dynamic, where the 2 bits are the counter DAI;

0 bits otherwise.

TPC command for scheduled PUCCH – 2 bits as defined in Subclause 7.2.1 of [5, TS 38.213]

PUCCH resource indicator – 3 bits as defined in Subclause 9.2.3 of [5, TS 38.213]

PDSCH-to-HARQ_feedback timing indicator – 0, 1, 2, or 3 bits as defined in Subclause 9.2.3 of [5, TS 38.213]. The bitwidth for this field is determined as $[\lceil \log_2(I) \rceil]$ bits, where I is the number of entries in TABLE 6-continued the higher layer parameter dl-DataToUL-ACK.

Antenna port(s) – 4, 5, or 6 bits as defined by Tables 7.3.1.2.2-1/2/3/4, where the number of CDM groups without data of values 1, 2, and 3 refers to CDM groups {0}, {0,1}, and {0, 1,2} respectively. The antenna ports $\{p_0, \ldots, p_{\nu-1}\}$ shall be determined according to the ordering of DMRS port(s) given by Tables 7.3.1.2.2-1/2/3/4.

If a UE is configured with both dmrs-DownlinkForPDSCH-MappingTypeA and dmrs-DownlinkForPDSCH-MappingTypeB, the bitwidth of this field equals $\max\{x_A, x_B\}$, where $x_A$ is the “Antenna ports” bitwidth derived according to dmrs-DownlinkForPDSCH-MappingTypeA and $x_B$ is the “Antenna ports” bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.

Transmission configuration indication – 0 bit if higher layer parameter tci-PresentInDCI is not enabled; otherwise 3 bits as defined in Subclause 5.1.5 of [6, TS38.214].

If “Bandwidth part indicator” field indicates a bandwidth part other than the active bandwidth part, if the higher layer parameter tci-PresentInDCI is not enabled for the CORESET used for the PDCCH carrying the DCI format 1_1, the UE assubmes tci-PresentInDCI is not enabled for all CORESETs in the indicated bandwidth part;

otherwise, the UE assumes tci-PresentInDCI is enabled for all CORESETs in the indicated bandwidth part;

SRS request – 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].

CBG transmission information (CBGTI) – 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.

CBG flushing out information (CBGFI) – 1 bit if higher layer parameter codeBlockGroupFlushIndicator is configured as “TRUE”, 0 bit otherwise.

DMRS sequence initialization – 1 bit.

Hereinafter, a time domain resource allocation method for a data channel in a 5G communication system will be described.

The base station may configure time domain resource allocation information (e.g., this may be constituted in the form of a table) on the downlink data channel (PDSCH) and the uplink data channel (PUSCH) to the UE through the upper layer signaling (e.g., RRC signaling). The base station may configure a table composed of maximally maxNrofDL-Allocations=16 entries with respect to the PDSCH, and may configure a table composed of maximally maxNrofUL-Allocations=16 entries with respect to the PUSCH. The time domain resource allocation information may include, for example, PDCCH-to-PDSCH slot timing (this corresponds to a time interval in the unit of a slot between the time when the PDCCH is received and the time when the PDSCH that is scheduled by the received PDCCH is transmitted, and is indicated as KO) or PDCCH-to-PUSCH slot timing (this corresponds to a time interval in the unit of a slot between the time when the PDCCH is received and the time when the PUSCH that is scheduled by the received PDCCH is transmitted, and is indicated as K2), information on the location and length of a start symbol in which the PDSCH or PUSCH is scheduled in the slot, and a mapping type of the PDSCH or PUSCH. For example, information, such as in the following table, may be notified from the base station to the UE.

TABLE 7

| PDSCH-TimeDomainResourceAllocationList information element |
|---|
| PDSCH-TimeDomainResourceAllocationList ::= SEQUENCE (SIZE (1..maxNrofDL-Allocations)) OF PDSCH-TimeDomainResourceAllocation<br>PDSCH-TimeDomainResourceAllocation ::= SEQUENCE {<br>k0 INTEGER(0..32)<br>OPTIONAL, -- Need S<br>mappingType ENUMERATED {typeA, typeB},<br>startSymbolAndLength INTEGER (0..127)<br>} |

TABLE 8

| PUSCH-TimeDomainResourceAllocation information element |
|---|
| PUSCH-TimeDomainResourceAllocationList ::= SEQUENCE (SIZE(1..maxNrofUL-Allocations)) OF PUSCH-TimeDomainResourceAllocation<br>PUSCH-TimeDomainResourceAllocation ::= SEQUENCE {<br>k2 INTEGER(0..32)<br>OPTIONAL, -- Need S<br>mappingType ENUMERATED {typeA, typeB},<br>startSymbolAndLength INTEGER (0..127)<br>} |

The base station may notify the UE of one of entries of a table for the time domain resource allocation information through L1 signaling (e.g., DCI) (e.g., this may be indicated as a "time domain resource allocation" field in the DCI). The UE may acquire the time domain resource allocation information for the PDSCH or PUSCH based on the DCI received from the base station.

Hereinafter, a frequency domain resource allocation method for a data channel in a 5G communication system will be described.

In 5G, a method for indicating frequency domain resource allocation information for the downlink data channel (PDSCH) and the uplink data channel (PUSCH) may support two types: resource allocation type 0 and resource allocation type 1.

Resource Allocation Type 0

RB allocation information may be notified from the base station to the UE in the form of a bitmap for a resource block group (RBG). In this case, the RBG may be composed of a set of continuous virtual RBs (VRBs), and the size P of the RBG may be determined based on the value configured by an upper layer parameter rbg-Size and the size value of the bandwidth part defined in the following table.

TABLE 9

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number $N_{RBG}$ of RBGs of the bandwidth part i having the size of $$N_{BWP,i}^{size}$$

may be defined as follows.

$$N_{RBG} = \lceil (N_{BWP,i}^{size} + (N_{BWP,i}^{start} \bmod P))/P \rceil, \text{ where}$$

$$\text{the size of the first } RBG \text{ is } RBG_0^{size} = P - N_{BWP,i}^{start} \bmod P,$$

$$\text{the size of the last } RBG \text{ is } RBG_{last}^{size} =$$

$$(N_{BWP,i}^{start} + N_{BWP,i}^{size}) \bmod P \text{ if } (N_{BWP,i}^{start} + N_{BWP,i}^{size}) \bmod P > 0 \text{ and } P \text{ otherwise,}$$

$$\text{the size of all other } RBGs \text{ is } P.$$

The bits of the bitmap having the bit size of $N_{RBG}$ may correspond to the RBBs, respectively. Indexes may be given to the RBGs in the order of frequency increases, starting from the lowest frequency location of the bandwidth part. With respect to $N_{RBG}$ RBGs in the bandwidth part, RBG #0 to RBG # ($N_{RBG}$−1) may be mapped onto the MSB to LSB of the RBG bitmap. In a case that a specific bit value in the bitmap is 1, the UE may determine that the RBG corresponding to the corresponding bit value has been allocated, and, in a case that the specific bit value in the bitmap is 0, the UE may determine that the RBG corresponding to the corresponding bit value has not been allocated.

Resource Allocation Type 1

The RB allocation information may be notified from the base station to the UE as information on the start location and length for each of the continuously allocated VRBs. In this case, interleaving or non-interleaving may be additionally applied to the continuously allocated VRBs. The resource allocation field of the resource allocation type 1 may be composed of resource indication values (RIVs), and the RIV may be composed of a start point $RB_{start}$ of the VRB and a length $L_{RBs}$ of the continuously allocated RBs. More specifically, the RIV in the bandwidth part having the size of $$N_{BWP}^{size}$$

may be defined as follows.

$$\text{if } (L_{RBz} - 1) \leq \lfloor N_{BWP}^{size}/2 \rfloor \text{ then}$$

$$RIV = N_{BWP}^{size}(L_{RBs} - 1) + RB_{start}$$

$$\text{else}$$

$$RIV = N_{BWP}^{size}(N_{BWP}^{size} - L_{RBs} + 1) + (N_{BWP}^{size} - 1 - RB_{start})$$

$$\text{where } L_{RBs} \geq 1 \text{ and shall not exceed } N_{BWP}^{size} - RB_{start}.$$

Hereinafter, a downlink control channel in a 5G communication system will be described in more detail with reference to the figures.

Figure 4:
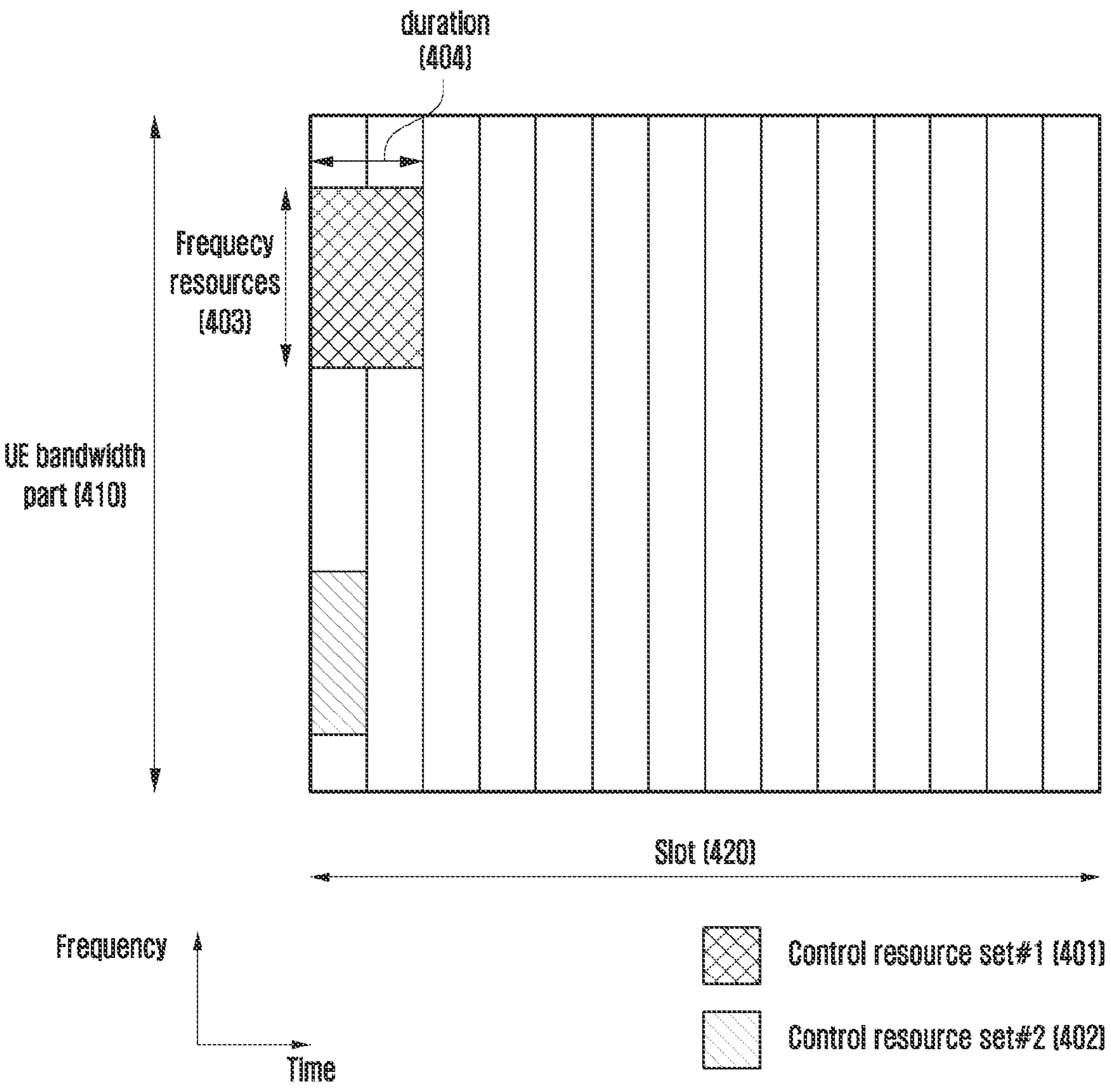
FIG. 4 is a diagram illustrating an example of a control resource set (CORESET) on which a downlink control channel is transmitted in a 5G wireless communication system according to various embodiments.

FIG. 4 is a diagram illustrating an example of a control resource set for transmitting a downlink control channel in a 5G wireless communication system according to various embodiments. FIG. 4 illustrates an example in which a UE bandwidth part 410 is configured on a frequency axis, and two control resource sets (control resource set #1 401 and control resource set #2 402) are configured in one slot 420 on a time axis. The control resource sets 401 and 402 may be configured to a specific frequency resource 403 in the whole UE bandwidth part 410 on the frequency axis. On the time axis, one or a plurality of OFDM symbols may be configured, and this may be defined as a control resource set duration 404. With reference to the example of FIG. 4, the control resource set #1 401 may be configured with a control resource set duration of two symbols, and the control resource set #2 402 may be configured with a control resource set duration of one symbol.

The control resource set in 5G as described above may be configured from the base station to the UE through upper layer signaling (e.g., system information, MIB, and RRC signaling). Configuration of the control resource set to the UE may, for example, refer to providing of information, such as a control resource set identity, a frequency location of the control resource set, and a control resource set symbol duration. For example, information that is provided to configure the control resource set is as follows.

TABLE 10

```
ControlResourceSet ::=                          SEQUENCE {
    -- Corresponds to L1 parameter 'CORESET-ID'
  controlResourceSetId                          ControlResourceSetId,
  frequencyDomainResources                      BIT STRING (SIZE (45)),
  duration                                      INTEGER (1..maxCoReSetDuration),
```

TABLE 10-continued

```
  cce-REG-MappingType                                        CHOICE {
    interleaved                               SEQUENCE {
      reg-BundleSize                          ENUMERATED {n2, n3, n6},
      precoderGranularity                     ENUMERATED {sameAsREG-bundle,
allContiguousRBs},
      interleaverSize                         ENUMERATED {n2, n3, n6}
      shiftIndex                      INTEGER(0..maxNrofPhysicalResourceBlocks-
1)OPTIONAL
    },                                                       NULL
    nonInterleaved
},
  tci-StatesPDCCH                         SEQUENCE(SIZE      (1..maxNrofTCI-
  StatesPDCCH)) OF TCI-StateId            OPTIONAL,
  tci-PresentInDCI                        ENUMERATED {enabled}
    -- Need S                                                OPTIONAL,
}
```

In Table 10, tci-StatesPDCCH (so called "transmission configuration indication (TCI) state") configuration information may include information on one or a plurality of SS/PBCH block indexes that are in a quasi co-located (QCL) relationship with the DMRS transmitted from the corresponding control resource set or channel state information reference signal (CSI-RS) indexes.

Figure 5:
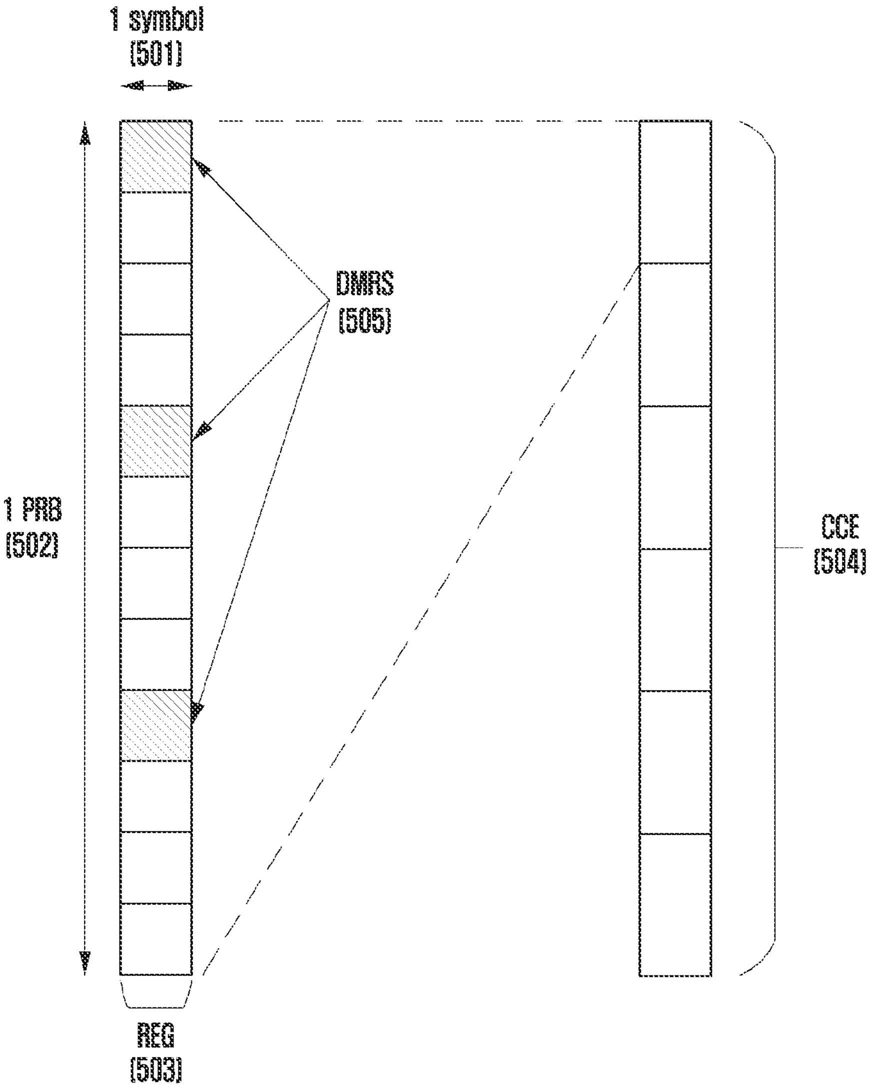
FIG. 5 is a diagram illustrating an example of a base unit of time and frequency resources constituting a downlink control channel that can be used in 5G according to various embodiments.

FIG. 5 is a diagram illustrating an example of a base unit of time and frequency resources constituting a downlink control channel that can be used in 5G according to various embodiments.

With reference to FIG. 5, the base unit of the time and frequency resources constituting the control channel may be called a resource element group (REG) 503, and the REG 503 may be defined as one OFDM symbol 501 on a time axis and one physical resource block 502 on a frequency axis, that is, 12 subcarriers. A downlink control channel allocation unit may be configured through concatenation of the REG 503.

As illustrated in FIG. 5, if the base unit for assigning the downlink control channel in the 5G is a control channel element (CCE) 504, one CCE 504 may be composed of a plurality of REGs 503. With reference to the REG 503 illustrated in FIG. 5 as an example, the REG 503 may be composed of 12 REs, and, if one CCE 504 is composed of 6 REGs 503, one CCE 504 may be is composed of 72 REs. If a downlink control resource set is configured, the corresponding resource set may be composed of a plurality of CCEs 504, and a specific downlink control channel may be mapped onto one or a plurality of CCEs 504 to be transmitted in accordance with an aggregation level (AL) in the control resource set. The CCEs 504 in the control resource set may be discriminated by numbers, and, in this case, the numbers of the CCEs 504 may be assigned in accordance with a logical mapping method.

The base unit of the downlink control channel illustrated in FIG. 5, that is, the REG 503, may include all of REs onto which the DCI is mapped and a resource set onto which a DMRS 505 that is a reference signal for decoding the REs is mapped. As illustrated in FIG. 5, three DMRSs 505 may be transmitted in one REG 503. The number of CCEs necessary to transmit the PDCCH may be 1, 2, 4, 8, or 16 in accordance with the aggregation level (AL), and the different numbers of CCEs may be used to implement a link adaptation of the downlink control channel. For example, if the aggregation level is AL=L, one downlink control channel may be transmitted through L CCEs. It is necessary for a UE to detect a signal in a state in which the UE does not know information on the downlink control channel, and a search space indicating a set of CCEs is defined for blind decoding. The search space is a set of downlink control channel candidates composed of CCEs that the UE should attempt to decode on a given aggregation level, and the UE may have a plurality of search spaces because there are several aggregation levels at which 1, 2, 4, 8, or 16 CCEs are bound into one bundle. The search space set may, for example, be defined as a set of search spaces at all configured aggregation levels.

The search space may be classified into a common search space and a UE-specific search space. UEs in a specific group or all UEs may monitor the common search space of a PDCCH in order to receive dynamic scheduling of system information or cell-common control information such as a paging message. For example, PDSCH scheduling allocation information for transmitting an SIB including operator information of a cell may be received by monitoring the common search space of the PDCCH. In a case of the common search space, UEs of a specific group or all UEs should receive the PDCCH, and thus the common search space may be defined as a pre-engaged CCE set. It may be possible to receive scheduling allocation information of a UE-specific PDSCH or PUSCH through monitoring of the UE-specific search space of the PDCCH. The UE-specific search space may be UE-specifically defined as a function of UE identity and various system parameters.

In 5G, parameters for search spaces for the PDCCH may be configured from the base station to the UE through upper layer signaling (e.g., SIB, MIB, and RRC signaling). For example, the base station may configure, to the UE, the number of PDCCH candidates at each aggregation level L, a monitoring period for search spaces, a monitoring occasion of an intra-slot symbol unit for search spaces, a search space type (common search space or UE-specific search space), a combination of a DCI format and an RNTI intended to be monitored in corresponding search spaces, and control resource set indexes intended to monitor the search spaces. For example, the parameter for the search space for the PDCCH may include the following information.

TABLE 11

```
SearchSpace ::=                                    SEQUENCE {
  -- Identity of the search space. SearchSpaceId = 0 identifies the SearchSpace
configured via PBCH (MIB) or ServingCellConfigCommon.
  searchSpaceId                                          SearchSpaceId,
  controlResourceSetId                               ControlResourceSetId,
  monitoringSlotPeriodicity AndOffset             CHOICE {
    sl1
  NULL,
    sl2
  INTEGER (0..1),
    sl4
  INTEGER (0..3),
    sl5
  INTEGER (0..4),
    sl8
  INTEGER (0..7),
    sl10
  INTEGER (0..9),
    sl16
  INTEGER (0..15),
    sl20
  INTEGER (0..19)
}
                                          OPTIONAL,
duration                                           INTEGER (2..2559)
monitoring Symbols WithinSlot                      BIT STRING (SIZE (14))
                                                         OPTIONAL,
nrofCandidates                                           SEQUENCE {
    aggregationLevel1
  ENUMERATED {n0, n1, n2, n3, n4, n5, n6, n8},
    aggregationLevel2
  ENUMERATED {n0, n1, n2, n3, n4, n5, n6, n8},
    aggregationLevel4
  ENUMERATED {n0, n1, n2, n3, n4, n5, n6, n8},
    aggregationLevel8
  ENUMERATED {n0, n1, n2, n3, n4, n5, n6, n8},
    aggregationLevel16
  ENUMERATED {n0, n1, n2, n3, n4, n5, n6, n8}
  }
searchSpaceType                                          CHOICE {
                  -- Configures this search space as common search space (CSS) and
DCI formats to monitor.
  common                                           SEQUENCE {
    }
  ue-Specific                                      SEQUENCE {
  -- Indicates whether the UE monitors in this USS for DCI formats 0-0 and 1-0 or for
formats 0-1 and 1-1.
  formats                                          ENUMERATED
{ formats0-0-And-1-0, formats0-1-And-1-1},
          ...
  }
```

The base station may configure one or a plurality of search space sets to the UE in accordance with the configuration information. According to various embodiments, the base station may configure search space set 1 and search space set 2 to the UE. The UE may be configured to monitor DCI format A scrambled by X-RNTI in the common search space in the search space set 1 and to monitor DCI format B scrambled by Y-RNTI in the UE-specific search space in the search space set 2.

According to the configuration information, one or a plurality of search space sets may exist in the common search space or the UE-specific search space. For example, search space set #1 and search space set #2 may be configured as the common search spaces, and search space set #3 and search space set #4 may be configured as the UE-specific search spaces.

In the common search space, the following combinations of DCI formats and RNTIs may be monitored. Of course, the combinations are not limited to the following examples.

- DCI format 0_0/1_0 with CRC scrambled by C-RNTI, CS-RNTI, SP-CSI-RNTI, RA-RNTI, TC-RNTI, P-RNTI, and SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI and TPC-PUCCH-RNTI
- DCI format 2_3 with CRC scrambled by TPC-SRS-RNTI In the UE-specific search space, the following combinations of DCI formats and RNTIs may be monitored. Of course, the combinations are not limited to the following examples.

- DCI format 0_0/1_0 with CRC scrambled by C-RNTI, CS-RNTI, and TC-RNTI
- DCI format 1_0/1_1 with CRC scrambled by C-RNTI, CS-RNTI, and TC-RNTI The above-specified RNTIs may follow the following definitions and purposes.

- C-RNTI (Cell RNTI): UE-specific PDSCH scheduling purposes
- TC-RNTI (Temporary Cell RNTI): UE-specific PDSCH scheduling purposes
- CS-RNTI (Configured Scheduling RNTI): semi-statically configured UE-specific PDSCH scheduling purposes RA-RNTI (Random Access RNTI): PDSCH scheduling purposes at a random access step
P-RNTI (Paging RNTI): PDSCH scheduling purposes for transmitting paging
SI-RNTI (System Information RNTI): PDSCH scheduling purposes for transmitting system information
INT-RNTI (Interruption RNTI): Purposes for notifying of whether to puncture PDSCH
TPC-PUSCH-RNTI (Transmit Power Control for PUSCH RNTI): Power control command indication purposes on PUSCH
TPC-PUCCH-RNTI (Transmit Power Control for PUCCH RNTI): Power control command indication purposes on PUCCH
TPC-SRS-RNTI (Transmit Power Control for SRS RNTI): Power control command indication purposes for SRS The above-specified DCI formats may follow the following definitions.

TABLE 12

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC Commands for SRS transmissions by one or more UEs |

In the 5G, in the control resource set p and the search space set s, the search space of the aggregation level L may be expressed as in the following mathematical expression.

$$L\cdot\left\{\left(Y_{p,n^{\mu}_{s,f}}\left\lfloor\frac{m_{s,n_{CI}}\cdot N_{CCE,p}}{L\cdot M^{(L)}_{p,s,max}}\right\rfloor+n_{CI}\right)\bmod\lfloor N_{CCE,p}/L\rfloor\right\}+i \quad \text{[Mathematical Expression 1]}$$

L: Aggregation Level
$n_{CI}$: Carrier index
$N_{CCE,p}$: Total number of CCEs existing in control resource set p
$n^{\mu}_{s,f}$: Slot index
$M^{(L)}_{p,s,max}$: The number of PDCCH candidates of aggregation level L
$M_{snCI}=0, \ldots, M^{(L)}_{p,s,max}-1$: PDCCH candidate indexes of aggregation level L
$i=0, \ldots, L-1$ $$-Y_{p,n^{\mu}_{s,f}}=\left(A_p\cdot Y_{p,n^{\mu}_{s,f}-1}\right)\bmod D,$$

$$Y_{p,-1}=n_{RNTI}\neq 0,\ A_0=39827,\ A_1=39829,$$

$A_2=39839$, $D=65537$
$n_{RNTI}$: UE identifier
Y_(p,$n^{\mu}_{s,f}$) value may correspond to 0 in case of common search space.
Y_(p,$n^{\mu}_{s,f}$) value may correspond to a value that is changed according to the UE identity (C-RNTI or ID configured by a base station to a UE) and time indexes in case of UE-specific search space.

In 5G, a plurality of search space sets may be configured by different parameters (e.g., parameters of Table 10), and thus a set of search space sets being monitored by the UE may differ at each time. For example, in a case that search space set #1 is configured in an X-slot period, and search space set #2 is configured in a Y-slot period in a state where X and Y are different from each other, the UE may monitor all of search space set #1 and search space set #2 in a specific slot, and it may monitor one of search space set #1 and search space set #2 in a specific slot.

If a plurality of search space sets is configured to the UE, the following conditions may be considered in a method for determining search space sets that should be monitored by the UE.

[Condition 1: Restriction on the Maximum Number of PDCCH Candidates]

The number of PDCCH candidates that can be monitored per slot does not exceed $M^{\mu}$. The $M^{\mu}$ may be defined as the maximum number of PDCCH candidates per slot in a cell in which the subcarrier spacing is configured to $15\cdot 2^{\mu}$ KHz, and it may be defined as in the table below.

TABLE 13

| μ | Maximum number of PDCCH candidates per slot and per serving cell ($M^{\mu}$) |
|---|---|
| 0 | 44 |
| 1 | 36 |
| 2 | 22 |
| 3 | 20 |

[Condition 2: Restriction on the Maximum Number of CCEs]

The number of CCEs constituting the whole search space (here, the whole search space may, for example refer to a set of the total CCEs corresponding to union areas of a plurality of search space sets) for each slot does not exceed $C^{\mu}$. The $C^{\mu}$ may be defined as the maximum number of CCEs for each slot in a cell in which the subcarrier spacing is configured to $15\cdot 2^{\mu}$ kHz, and it may be defined as in the table below.

TABLE 14

| μ | Maximum number of CCEs per slot and per serving cell ($C^{\mu}$) |
|---|---|
| 0 | 56 |
| 1 | 56 |
| 2 | 48 |
| 3 | 32 |

For convenience in explanation, a situation in which all of the conditions 1 and 2 are satisfied at a specific time is defined as "condition A". Accordingly, a case in which the condition A is not satisfied may refer to a case in which at least one of the conditions 1 and 2 is not satisfied.

The case in which the condition A is not satisfied may occur at the specific time in accordance with the configuration of the search space sets of the base station. If the condition A is not satisfied at the specific time, the UE may select and monitor only some of the search space sets configured to satisfy the condition A at the corresponding time, and the base station may transmit the PDCCH on the selected search space set.

Methods for selecting some search spaces among all the configured search space sets may follow the following methods.

bundle. The REG bundle may be defined as one or a plurality of REG sets. The UE may determine a CCE-to-REG mapping method in the corresponding control resource set as the following method based on whether to perform interleaved or non-interleaved transmission configured by the base station.

TABLE 15

The CCE-to-REG mapping for a control-resource set can be interleaved or non-interleaved and is described by REG bundles:

REG bundle i is defined as REGs {iL,iL + 1,..., iL + L −1} where L is the REG bundle size, $i = 0, 1, \ldots, N_{REG}^{CORESET}/L - 1$, and $N_{REG}^{CORESET} = N_{RB}^{CORESET} N_{symb}^{CORESET}$ is the number of REGs in the CORESET CCE j consists of REG bundles {ƒ(6j/L), ƒ(6j/L + 1),..., ƒ(6j/L + 6/L − 1)} where ƒ(.) is an interleaver For non-interleaved CCE-to-REG mapping, L = 6 and ƒ(x) = x.

For interleaved CCE-to-REG mapping, $L \in \{2, 6\}$ for $N_{symb}^{CORESET} = 1$ and $L \in \{N_{symb}^{CORESET}, 6\}$ for $N_{symb}^{CORESET} \in \{2, 3\}$.

The interleaver is defined by $$f(x) = (rC + c + n_{shift}) inod\left(N_{REG}^{CORESET}/L\right)$$

$x = cR + r$ $r = 0, 1, \ldots, R - 1$ $c = 0, 1, \ldots, C - 1$ $C = N_{REG}^{CORESET}/(LR)$ where R ∈ {2,3,6}.

If the condition A for the PDCCH is not satisfied at the specific time (slot): The UE (or the base station) may preferentially select a search space set of which the search space type is configured to the common search space rather than the search space set of which the search space type is configured to the UE-specific search space among the search space sets existing at the corresponding time.

If all the search space sets of which the search space type is configured to the common search space are selected (i.e., if the condition A is satisfied even after all the search spaces of which the search space type is configured to the common search space are selected), the UE (or the base station) may select the search space sets of which the search space type is configured to the UE-specific search space. In this case, if there are a plurality of search space sets of which the search space type is configured to the UE-specific search space, the search space set having a low search space set index may have a higher priority. In consideration of the priority, the UE (or base station) may select the UE-specific search space sets within a range in which the condition A is satisfied.

In 5G, the control resource set may be composed of $N_{RB}^{CORESET}$ RBs in the frequency domain, and may be composed of $N_{symb}^{CORESET} \in \{1,2,3\}$ symbols on the time axis. One CCE may be composed of 6 REGs, and the REG may be defined as one RB during one OFDM symbol. In one control resource set, indexes of the REGs may be set in time-first order starting from REG index 0, the lowest RB, and the first OFDM symbol of the control resource set.

In 5G, an interleaving method and a non-interleaving method are supported as a PDCCH transmission method. The base station may configure whether to perform interleaved or non-interleaved transmission for each control resource set for the UE through the upper layer signaling. The interleaving may be performed in units of an REG Hereinafter, a rate matching operation and a puncturing operation will be described in detail.

If a time and frequency resource A that intends to transmit a certain symbol sequence A overlaps a certain time and frequency resource B, the rate matching or puncturing operation may be considered as a transmission and reception operation of a channel A in consideration of an area resource C in which a resource A and resource B overlap each other. The detailed operation may follow the following contents.

Rate Matching Operation

If there exists an area (hereinafter, resource C), that overlaps resource B (this may, for example, refer to a resource configured for rate matching or a scheduled resource for other data for the UE or for another UE), of the whole resource A that intends to transmit symbol sequence A to the UE, the base station may map channel A only with respect to the remaining resource area excluding the overlapping area, and transmit the symbol sequence mapped onto the channel A. For example, in a case that the symbol sequence A is composed of {symbol #1, symbol #2, symbol #3, symbol #4}, and the resource A is {resource #1, resource #2, resource #3, resource #4} and the resource B is {resource #3, resource #5}, the base station may sequentially map the symbol sequence A onto {resource #1, resource #2, resource #4}, that is the remaining resources excluding {resource #3} corresponding to the resource C of the resource A, and transmit the mapped symbol sequence A. As a result, the base station may map the symbol sequence {symbol #1, symbol #2, symbol #3} onto {resource #1, resource #2, resource #4}, and transmit the mapped symbol sequence.

The UE may determine the resource A and resource B from the scheduling information received from the base station, and, through this, may determine the resource C that is the area in which the resource A and resource B overlap each other. Under the assumption that the symbol sequence A is mapped onto the remaining area excluding the resource C among the whole resource A, and is transmitted, the UE may receive the symbol sequence A. For example, in a case that the symbol sequence A is composed of {symbol #1, symbol #2, symbol #3, symbol #4}, and the resource A is {resource #1, resource #2, resource #3, resource #4} and the resource B is {resource #3, resource #5}, the UE may receive the symbol sequence A under the assumption that the symbol sequence A is sequentially mapped onto {symbol #1, symbol #2, symbol #4}, that is the remaining resources excluding {resource #3} corresponding to the resource C among the resource A. That is, the UE may receive data under the assumption that the resource corresponding to the resource C is not used for PDSCH mapping. As a result, the UE may perform the subsequent series of reception operations under the assumption that the symbol sequence {symbol #1, symbol #2, symbol #3} is mapped onto {resource #1, resource #2, resource #4}, and the mapped symbol sequence is transmitted.

Puncturing Operation

If there exists an area (hereinafter, resource C) that overlaps resource B (this may mean a resource configured for puncturing or a scheduled resource for other data for the UE or for another UE) among the whole resource A that intends to transmit symbol sequence A to the UE, the base station may map the symbol sequence A onto the whole resource A, but may not perform the transmission in the resource area corresponding to the resource C, but may perform the transmission only with respect to the remaining resource area excluding the resource C among the resource A. For example, in a case that the symbol sequence A is composed of {symbol #1, symbol #2, symbol #3, symbol #4}, and the resource A is {resource #1, resource #2, resource #3, resource #4} and the resource B is {resource #3, resource #5}, the base station may map the symbol sequence A {symbol #1, symbol #2, symbol #3, symbol #4} onto the resource A {resource #1, resource #2, resource #3, resource #4}, may transmit only the symbol sequence {symbol #1, symbol #2, symbol #4} corresponding to {resource #1, resource #2, resource #4}, that is the remaining resources excluding {resource #3} corresponding to the resource C among the resource A, and may not transmit {symbol #3} mapped onto {resource #3} corresponding to the resource C. As a result, the base station may map the symbol sequence {symbol #1, symbol #2, symbol #4} onto {resource #1, resource #2, resource #4}, and transmit the mapped symbol sequence.

The UE may determine the resource A and resource B from the scheduling information received from the base station, and, through this, may determine the resource C that is the area in which the resource A and resource B overlap each other. Under the assumption that the symbol sequence A is mapped onto the whole resource A, but is transmitted only in the remaining area excluding the resource C among the resource area A, the UE may receive the symbol sequence A. For example, in a case that the symbol sequence A is composed of {symbol #1, symbol #2, symbol #3, symbol #4}, and the resource A is {resource #1, resource #2, resource #3, resource #4} and the resource B is {resource #3, resource #5}, the UE may assume that the symbol sequence A {symbol #1, symbol #2, symbol #3, symbol #4} is mapped onto the resource A {resource #1, resource #2, resource #3, resource #4}, but {symbol #3} mapped onto {resource #3} corresponding to the resource C is not transmitted, and the UE may perform the subsequent series of reception operations under the assumption that the symbol sequence {symbol #1, symbol #2, symbol #4} corresponding to {resource #1, resource #2, resource #4} that is the remaining resources excluding {resource #3} corresponding to the resource C among the resource A is mapped and transmitted. As a result, the UE may perform the subsequent series of reception operations under the assumption that the symbol sequence {symbol #1, symbol #2, symbol #4} is mapped onto {resource #1, resource #2, resource #4} and the mapped symbol sequence is transmitted.

A method for configuring rate matching resources for the purpose of the rate matching of the 5G communication system will be described. The rate matching, for example, may refer to adjustment of the size of a signal in consideration of the amount of resource capable of transmitting the signal. For example, the rate matching of a data channel, for example, may refer to that the data channel not being mapped and transmitted with respect to a specific time and frequency resource area, and thus the size of the data is adjusted.

Figure 6:
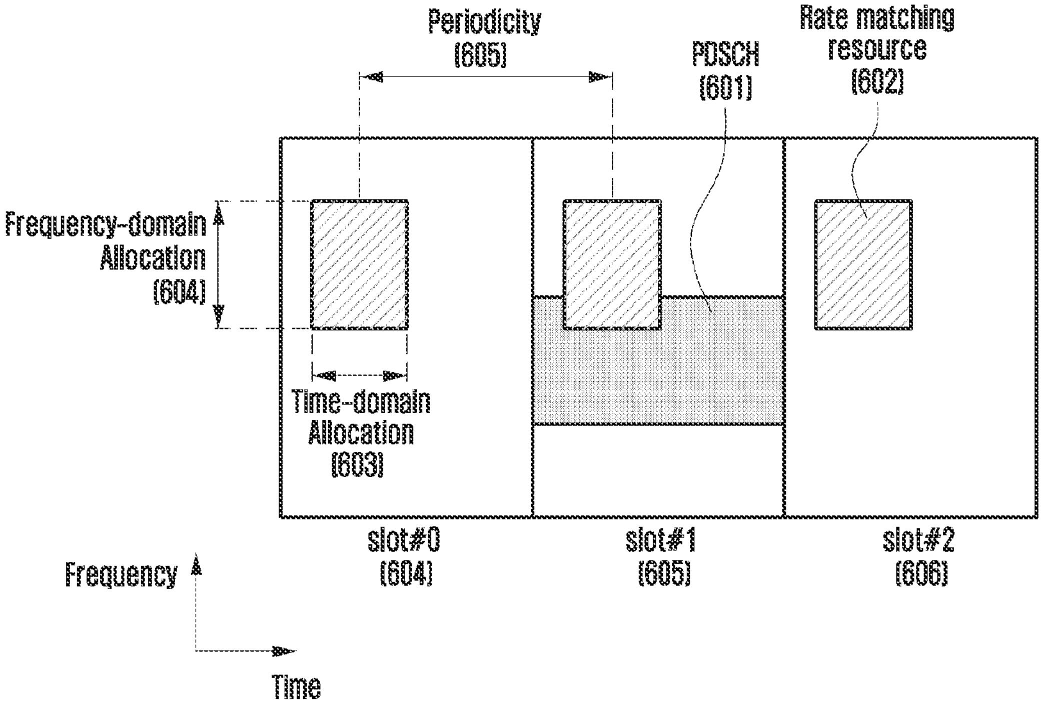
FIG. 6 is a diagram explaining an example method in which a base station and a UE transmit and receive data in consideration of a downlink data channel and a rate matching resource according to various embodiments.

FIG. 6 is a diagram explaining an example method in which a base station and a UE transmit or receive data in consideration of a downlink data channel and a rate matching resource accord to various embodiments.

In FIG. 6, a downlink data channel (PDSCH) 601 and a rate matching resource 602 are illustrated. The base station may configure one or a plurality of rate matching resources 602 to the UE through upper layer signaling (e.g., RRC signaling). In configuration information of the rate matching resource 602, time axis (domain) resource allocation information 603, frequency axis (domain) resource allocation information 604, and cycle (periodicity) information 605 may be included. Hereinafter, a bitmap corresponding to the frequency axis resource allocation information 604 is, for example, referred to as a "first bitmap", a bitmap corresponding to the time axis resource allocation information 603 is, for example, referred to as a "second bitmap", and a bitmap corresponding to the cycle information 605 is, for example, referred to as a "third bitmap". If all or some of time and frequency resources of a scheduled data channel 601 overlap the configured rate matching resource 602, the base station may transmit the data channel 601 by rate-matching the data channel 601 in a part of a rate matching resource 602, and the UE may perform reception and decoding after assuming that the data channel 601 has been rate-matched in the part of the rate matching resource 602.

The base station may dynamically notify the UE of whether to perform rate matching of the data channel through DCI in the configured rate matching resource part through additional configuration (corresponding to a "rate matching indicator" in the above-described DCI format). Specifically, the base station may select and group some of the configured rate matching resources into a rate matching resource group, and may instruct the UE whether to perform rate matching of a data channel for each rate matching resource group through the DCI by using the bitmap method. For example, in a case that 4 rate matching resources RMR #1, RMR #2, RMR #3, and RMR #4 are configured, the base station may configure RMG #1={RMR #1, RMR #2} and RMG #2={RMR #3, RMR #4} as the rate matching groups, and may instruct the UE whether to perform rate matching in RMG #1 and RMG #2, respectively, by using 2 bits in a DCI field by using the bitmap method. For example, the base station may configure the respective bits to "1" in a case that the rate matching should be performed, and may configure the respective bits to "0" in a case that the rate matching should not be performed.

In 5G, granularity of "RB symbol level" and "RE level" is supported as a method for configuring the above-described rate matching resource to the UE. More specifically, the following configuration method may follow.

RB Symbol Level

The UE may be configured with maximally 4 RateMatchPattern by bandwidth parts through upper layer signaling, and one RateMatchPattern may include the following information.

As a reserved resource in a bandwidth part, it may include a resource on which time and frequency resource areas of the corresponding reserved resource are configured through a combination of a bitmap of an RB level and a bitmap of a symbol level on frequency axis. The reserved resource may be spanned through one or two slots. A time domain pattern (periodicityAndPattern) in which the time and frequency domain composed of a bitmap pair of the RB level and the symbol level is repeated may be additionally configured.

A resource area corresponding to time and frequency domain resource areas configured by a control resource set in the bandwidth part and a time domain pattern configured by search space configuration in which the corresponding resource area is repeated may be included.

RE Level

The UE may be configured with at least one piece of the following information through upper layer signaling.

As configuration information (lte-CRS-ToMatchAround) for RE corresponding to an LTE CRS (cell-specific reference signal or common reference signal) pattern, there may be included at least one piece of information about the number of LTE CRS ports (nrofCRS-Ports) and an LTE-CRS-vshift(s) value (v-shift), center subcarrier location information (carrierFreqDL) of an LTE carrier from a reference frequency point (e.g., reference point A), LTE carrier bandwidth size (carrierBandwidthDL) information, and subframe configuration information (mbsfn-SubframConfigList) corresponding to a multicast-broadcast single-frequency network (MBSFN). The UE may determine the CRS location in an NR slot corresponding to an LTE subframe based on the above-described information.

Configuration information about a resource set corresponding to one or a plurality of zero power (ZP) CSI-RSs in the bandwidth part may be included.

Next, a rate matching process for the above-described LTE CRS will be described in detail. For coexistence of the long-term evolution (LTE) and new RAT (NR) (LTE-NR coexistence), the NR provides a function of configuring a pattern of a cell specific reference signal (CRS) of the LTE to an NR UE. More specifically, the CRS pattern may be provided by RRC signaling including at least one parameter in ServingCellConfig IE (Information Element) or ServingCellConfigCommon IE. The above parameter may include, for example, lte-CRS-ToMatchAround, Ite-CRS-PatternList1-r16, lte-CRS-PatternList2-r16, and crs-RateMatchPerCORESETPoolIndex-r16.

In Rel-15 NR, a function is provided in which one CRS pattern for each serving cell can be configured through the lte-CRS-ToMatchAround parameter. In Rel-16 NR, the above function has been extended so that a plurality of CRS patterns can be configured for each serving cell. More specifically, in a single-TRP (transmission and reception point) configuration UE, one CRS pattern may be configured for one LTE carrier, and, in a multi-TRP configuration UE, two CRS patterns may be configured for one LTE carrier.

For example, in the single-TRP configuration UE, a maximum of three CRS patterns may be configured for each serving cell through the lte-CRS-PatternList1-r16 parameter. As another example, in the multi-TRP configuration UE, the CRS may be configured for each TRP. That is, the CRS pattern for TRP1 may be configured through the lte-CRS-PatternList1-r16 parameter, and the CRS pattern for TRP2 may be configured through the lte-CRS-PatternList2-r16 parameter. Meanwhile, if two TRPs are configured as above, it may be determined through a crs-RateMatchPerCORESETPoolIndex-r16 parameter whether the CRS patterns of the TRP1 and TRP2 are all applied to a specific PDSCH or whether only the CRS pattern for one TRP is applied to the specific PDSCH, and, if the crs-RateMatchPerCORESETPoolIndex-r16 parameter is configured to be enabled, only the CRS pattern of one TRP may be applied, and, in other cases, the CRS patterns of two TRPs may be all applied.

Table 16 represents ServingCellConfig IE including the CRS pattern, and Table 17 represents RateMatchPatternLTE-CRS IE including at least one parameter for the CRS pattern.

TABLE 16

| | |
|---|---|
| ServingCellConfig : := | SEQUENCE { |
| tdd-UL-DL-ConfigurationDedicated | TDD-UL-DL-ConfigDedicated |
| OPTIONAL, -- Cond CDD | BWP-DownlinkDedicated |
| initialDownlinkBWP | |
| OPTIONAL, -- Need M | SEQUENCE (SIZE (1..maxNrofBWPs)) OF BWP-Id |
| downlinkBWP-ToReleaseList | |
| OPTIONAL, -- Need N | SEQUENCE (SIZE (1..maxNrofBNPs)) OF BWP-Downlink |
| downlinkBWP-ToAddModList | |
| OPTIONAL, -- Need N | BWP-Id |
| firstActiveDownlinkBWP-Id | ENUMERATED {ms2, ms3, ms4, m35, ms6, ma8, ms10, |
| OPTIONAL, -- Cond SyncAndCelLAda | ms40,ms50, m360, ms80,ms100, |
| bwp-InactivityTimer | ms7.50, ms1280, ms1920, ms2560, spare10, |
| ms20, ms30, | spare7, spare6, spare5, spare4, spare3, |
| ms200,ms300, ms500, | |
| spare9, spare8, | |
| spare2, spare1 } OPTIONAL, --Need R | |
| defaultDownlinkBWP-Id | BWP-Id |
| OPTIONAL, -- Need S | UplinkConfig |
| uplinkConfig | |
| OPTIONAL, -- Need M | UplinkConfig |
| supplementaryUplink | |
| OPTIONAL, -- Need M | SetupRelease { PDCCH-ServingCellConfig } |
| pdcch-ServingCellConfig | |
| OPTIONAL, -- Need M | SetupRelease { PDSCH-ServingCellConfig } |
| pdsch-ServingCellConfig | |

TABLE 16-continued

```
OPTIONAL; -- Need M                                  SetupRelease { CSI-MeasConfig }
CB1-MeasConfig
OPTIONAL, -- Need M                                  ENUMERATED {ms20, ms0, ms80, ms160, ms200, ms240,
   sCellDeactivationTimer                                        ms320, ma400, ms480, ms520, ms640,
ms72.0,                                                          ms840, ms1280, spare2,spare1}
OPTIONAL; -- Cond ServingCellWithoutPUCCH
   crossCarrierSchedulingConfig                      CrossCarrierSchedulingConfig
OPTIONAL, -- Need M
   tag-Id                                            TAG-Id,
   dummy                                             ENUMERATED {enabled}
OPTIONAL, -- Need R
   pathlossReferenceLinking                          ENUMERATED ( spCell, sCell]
OPTIONAL, -- Cond SCellOnly
   servingCellMO                                     MeasObjectId
OPTIONAL, -- Cond MeasObject
   ...,
   [[
   lte-CRS-ToMatchAround                             SetupRelease { RateMatchPatternLIE-CRS }
OPTIONAL, -- Need M
   rateMatchPatternToAddModList                      SEQUENCE (SIZE (1..maxNrofRateMatchPatterns) ) OF
RateMatchPattern     OPTIONAL,         -- Need N
   rateMatchPatternToReleaseList                     SEQUENCE (SIZE (1..maxNrofRateMatchPatterns) ) OF
RateMatchPatternId     OPTIONAL,       -- Need N
   downlinkChannelBW-PerSCS-List                     SEQUENCE (SIZE (1..maxSCSs) ) OF SCS-SpecificCarrier
OPTIONAL -- Need S
   ]],
   [[
   supplementaryUplinkRelease                        ENUMERATED ( true)
OPTIONAL, --Need N
   tdd-UL-DL-ConfigurationDedicated-IAB-MT-r16       TDD-UL-DL-ConfigDedicated-IAB-MT-r16
OPTIONAL, -- Cond. TDD_TAB
   dormantBWP-Config-r16                             SetupRelease { DormantBWP-Config-r16 }
OPTIONAL, -- Need M
   ca-SlotOffset-r16                                 CHOICE {
      refSCS15kHz                                       INTEGER (−2..2),
      refSCS30KHz                                       INTEGER (−5..5),
      refSCS60KHz                                       INTEGER (−10..10),
      refsSCS120KHz                                     INTEGER (−20..20)
   }
OPTIONAL, -- Cond AsyncCA
   channelAccessConfig-r16                           SetupRelease { ChannelAccessConfig-r16 }
OPTIONAL, -- Need M
   intraCellGuardBandsDL-List-r16                    SEQUENCE (SIZE (1..maxSCSs) ) OF
IntraCellGuardBandsPersCS-r16                        OPTIONAL, -- Need S
   intraCellGuardBandsUL-List-r16                    SEQUENCE (SIZE (1..maxSCSs) ) OF
IntraCellGuardBandsPerSCS-r16                        OPTIONAL, -- Need S
   csi-RS-ValidationWith-DCI-r16                     ENUMERATED { enabled)
OPTIONAL, -- Need R
   lte-CRS-PatternList1-r16                          SetupRelease { LTE-CRS-PatternList-r16 }
OPTIONAL, -- Need M
   lte-CRS-PatternList2-r16                          SetupRelease { LTE-CRS-PatternList-r16 }
OPTIONAL, -- Need M
   crs-RateMatch-PerCORESETPoolIndex-r16             ENUMERATED {enabled}
OPTIONAL, -- Need R
   enableTwoDefaultTCI-States-r16                    ENUMERATED {enabled}
OPTIONAL, -- Need R
   enableDefaultTCI-StatePerCoresetPoolIndex-r16         ENUMERATED {enabled}
OPTIONAL, -- Need R
   enableBeamSwitchTiming-r16                        ENUMERATED {true}
OPTIONAL, -- Need R
   cbg-TxDiffTBsProcessingType1-r16                  ENUMERATED {enabled}
OFTIONAL, -- Need R
   cbg-TxDiffTBsProcessingType2-r16                  ENUMERATED {enabled}
OPTIONAL -- Need R
   ]]
}
```

TABLE 17

```
                  - RateMatchPatternLTE-CRS
The IE RateMatchPatternLTE-CRS is used to configure a pattern to rate match around LTE CRS.
See TS 38.214 [19], clause 5.1.4.2.
                       RateMatchPatternLTE-CRS information element
-- ASN1START
-- TAG-RATEMATCHPATTERNLTE-CRS-START
```

TABLE 17-continued

```
RateMatchPatternLTE-CRS ::=     SEQUENCE {
   carrierFreqDL                  INTEGER (0..16383) ,
   carrierBandwidthDL             ENUMERATED {n6, n15, n25, n50, n75, n100, spare2,
spare1),
   mbsfn-SubframeConfigList       EUTRA-MBSFN-SubframeConfigList
OPTIONAL,, --Need M
   nrofCRS-Ports                  ENUMERATED (n1, n2, n4),
   v-Shift                        ENUMERATED (n0, n1, n2, n3, n4, n5)
}
LTE-CRS-PatternList-r16 : :=    SEQUENCE (SIZE (1..maxLTE-CRS-Patterns-r16)) OF
RateMatchPatternLTE-CRS
--TAG-RATEMATCHPATTERNLTE-CRS-STOP
-- ASN1STOP
```

| RateMatchPatternLTE-CRS field descriptions |
| --- |
| carrierBandwidthDL<br>BW of the LTE carrier in number of PRBs (see TS 38.214 [19], clause 5.1.4.2). |
| carrierFreqDL<br>Center of the LTE carrier (see TS 38.214 [19], clause 5.1.4.2). |
| mbsfn-SubframeConfigList<br>LTE MBSFN subframe configuration (see TS 38.214 [19], clause 5.1.4.2) |
| nrofCRS-Ports<br>Number of LTE CRS antenna port to rate-match around (see TS 38 214 [19], clause 5.1.4.2) |
| v-Shift<br>Shifting value v-shift in LTE to rate match around LTE CRS (see TS 38.214 [19], clause 5.1.4.2). |

As described above, in the Single-TRP configuration UE, only one CRS pattern may be configured for one LTE carrier. Accordingly, in a multi-cell environment, if adjacent cell(s) (e.g., LTE cell) uses a different CRS pattern from that of a serving cell (e.g., LTE-NR coexistence cell) of the UE, the UE may suffer considerable interferences with the adjacent cell(s). Although such problems of interferences with the UE may be reduced through an appropriate scheduling of the base station, the scheduling is performed in the unit of a resource block (RB), and the CRS is mapped in the unit of a resource element (RE), thereby causing limitations in reducing the interferences. Meanwhile, although in the disclosure, it is described by way of example that the adjacent cell is an LTE cell, and the serving cell is an LTE-NR coexistence cell, the disclosure is not limited in this respect. That is, if the rate matching is required for the signal being mapped in the RE unit in the adjacent cell even in a case that the serving cell is the LTE cell or NR cell, and the adjacent cell is the LTE cell or NR cell, the contents of the disclosure may be applied thereto.

According to an embodiment of the disclosure, the base station (e.g., NR base station) may configure the CRS pattern information of the adjacent LTE cell(s) for the UE (e.g., NR UE). According to an embodiment of the disclosure, the base station may additionally configure the CRS pattern information for the adjacent LTE cell(s) for the UE in addition to the CRS pattern information for the serving cell (LTE-NR coexistence cell). According to an embodiment of the disclosure, the CRS pattern information that the base station configures for the UE may include at least one of CRS pattern information of the serving cell (LTE-NR coexistence cell) or the adjacent LTE cell(s). Further, according to an embodiment of the disclosure, the CRS pattern information may include an indicator indicating whether the corresponding CRS pattern is for the serving cell or the adjacent LTE cell. Further, the CRS pattern information may include an indicator indicating whether the corresponding CRS pattern is for the rate matching or the interference cancellation. According to an embodiment of the disclosure, the configuration information may be transferred from the base station to the UE through the upper layer signaling (e.g., RRC signaling).

According to an embodiment of the disclosure, the base station may receive, from the neighbor base station(s), CRS pattern related information of the LTE serving cell(s) of the neighbor base station(s) (e.g., the information may include at least one of an LTE Cell ID, the number of CRS transmission ports, $v_{shift}$, and transmission power). The base station may select at least one of the LTE serving cell(s) and generate the CRS pattern(s) information to be configured for the UE based on the CRS pattern related information of the selected LTE serving cell(s). The base station may preferentially select the LTE serving cell(s) having a high transmission power in the process of selecting at least one of the LTE serving cell(s). The base station may configure the CRS pattern for the adjacent LTE cell(s) for the UE by transmitting the generated information to the UE.

According to an embodiment of the disclosure, the base station may receive, from the UE (e.g., UE supporting both the LTE and NR), information on the neighbor LTE serving cell(s) of the UE existing in the same frequency band as that of the serving cell configured for the UE (e.g., the information may include at least one of an LTE Cell ID, the number of CRS transmission ports, $v_{shift}$, and reception power). The base station may select at least one of the LTE serving cell(s) and generate the CRS pattern(s) information to be configured for the UE based on the CRS pattern related information of the selected LTE serving cell(s). The base station may preferentially select the LTE serving cell(s) having a high reception power in the process of selecting at least one of the LTE serving cell(s). The base station may configure the CRS pattern for the adjacent LTE cell(s) for the UE by transmitting the generated information to the UE.

According to an embodiment of the disclosure, the UE may receive at least one of the CRS pattern information on the serving cell (LTE-NR coexistence cell) and the adjacent LTE cell(s) and perform the rate matching based on at least one of the received CRS pattern information. That is, the UE may de-map PDSCH in a manner that the PDSCH is not mapped onto specific REs onto which the CRS(s) are mapped based on the CRS pattern information.

According to an embodiment of the disclosure, the UE may receive at least one of the CRS pattern information on the serving cell (LTE-NR coexistence cell) and the adjacent LTE cell(s) and perform interference cancellation based on at least one of the received CRS pattern information. That is, the UE may de-map the PDSCH in a manner that the PDSCH is mapped onto even specific REs onto which the CRS(s) are mapped based on the CRS pattern information.

According to an embodiment of the disclosure, the UE may receive at least one of the CRS pattern information on the serving cell (LTE-NR coexistence cell) and the adjacent LTE cell(s). The UE may perform rate matching based PDSCH de-mapping based on the CRS pattern information of the serving cell (LTE-NR coexistence cell) and perform interference cancellation based PDSCH de-mapping based on the CRS pattern information of the adjacent LTE cell(s).

According to an embodiment of the disclosure, the base station may generate the CRS pattern information on the serving cell (LTE-NR coexistence cell) and the adjacent LTE cell(s) and transmit the CRS pattern information to the UE through the RRC signaling, determine the RE(s) onto which the CRS(s) can be mapped through the CRS pattern information, determine whether to map the PDSCH onto the RE(s), and map the PDSCH onto the RE(s) in accordance with the determination and transmit the mapped PDSCH to the UE. According to an embodiment of the disclosure, the base station may perform rate matching based PDSCH mapping with respect to the RE(s), onto which the CRS that is used in an LTE carrier of the serving cell (LTE-NR coexistence cell) is mapped, among the RE(s), and perform the PDSCH mapping based on the interference cancellation with respect to the RE(s) onto which the CRS that is used in the adjacent LTE cell(s) is mapped.

According to an embodiment of the disclosure, the base station may perform the rate matching based PDSCH mapping with respect to the RE(s), onto which the CRS that is used in the LTE carrier of the serving cell (LTE-NR coexistence cell) is mapped, among the RE(s), utilize the RE(s) onto which the CRS that is used in the adjacent LTE cell(s) is mapped for the interference cancellation, and may not participate in whether to map the PDSCH. In other words, the PDSCH is not mapped onto the RE(s) onto which the CRS that is used in the LTE carrier of the serving cell (LTE-NR coexistence cell) is mapped, and the PDSCH may be mapped onto the CRS that is used in the adjacent LTE cell(s).

Figure 7A:
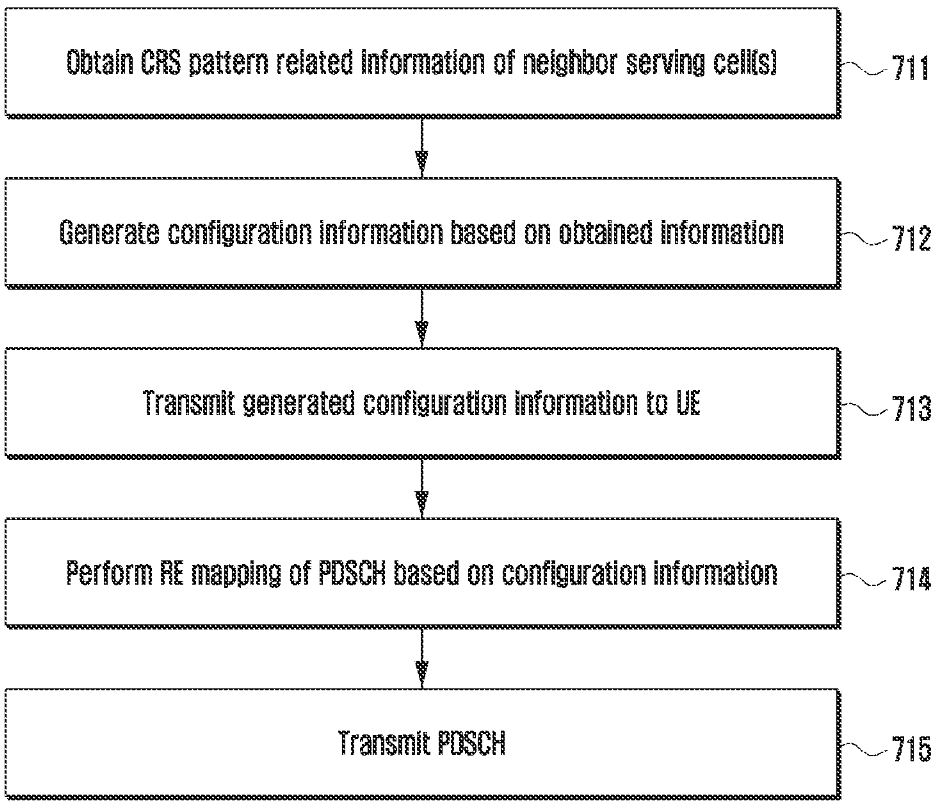
FIG. 7A is a diagram explaining an example of a base station operation in a wireless communication system according to various embodiments.

FIG. 7A illustrates an operation of an example base station according to various embodiments.

The base station may acquire CRS pattern related information of neighbor serving cell(s) (711).

The base station may generate the configuration information for the UE based on the acquired information (712) and transmit the generated configuration information to the UE (713).

The base station may perform the RE mapping of the PDSCH based on the configuration information for the UE (714) and transmit the PDSCH (715).

Figure 7B:
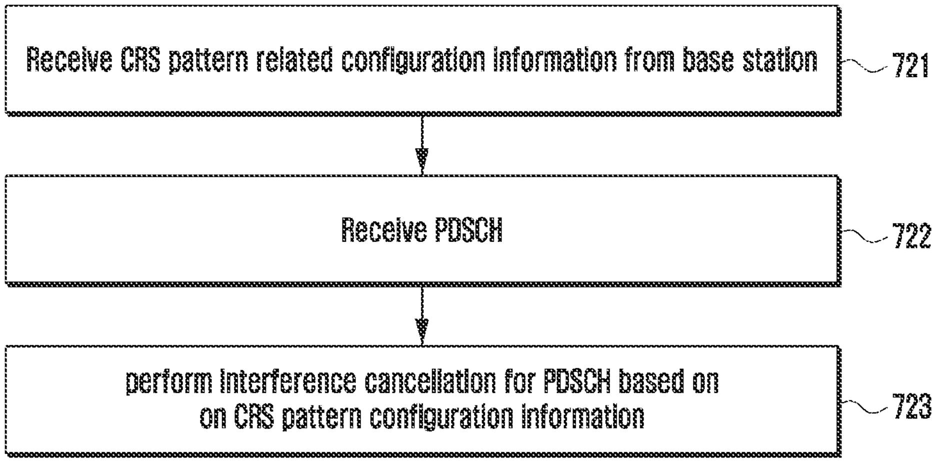
FIG. 7B is a diagram explaining an example of a UE operation in a wireless communication system according to various embodiments.

FIG. 7B illustrates an operation of an example UE according to various embodiments.

The UE may receive the CRS pattern related configuration information from the base station (721).

The UE may receive the PDSCH that is transmitted from the base station (722), and selectively perform the interference cancellation based on the received CRS pattern configuration information (723). For example, the UE may perform the interference cancellation for the specific RE(s).

According to an embodiment of the disclosure, information on one adjacent LTE cell among the pieces of information on the CRS pattern information of the adjacent LTE cell(s) that the base station transmits to the UE according to the various embodiments may include at least some of the list of Table 18.

According to an embodiment of the disclosure, the NR UE may acquire the $v_{shift}$ (v-Shift) value based on applying "mod 6" to the cell ID value of the adjacent LTE cell. According to an embodiment of the disclosure, the NR UE may assume that the cell ID of the adjacent LTE cell is the same as the cell ID of the NR cell, and the cyclic prefix of the adjacent LTE cell is a normal CP. According to an embodiment of the disclosure, the NR UE may assume that an "LTE radio frame boundary" is aligned with an "NR radio frequency boundary" in the serving cell (LTE-NR coexistence cell) and determine "a slot index in an LTE radio frame and an OFDM symbol index in a slot". Alternatively, if they are not aligned with each other, the base station may signal the offset (e.g., the offset is the value in the NR slot unit or the value in the LTE slot unit) to the UE, and the UE may determine "the slot index in the LTE radio frame and the OFDM symbol index in the slot" based on the signaling.

Alternatively, the base station may signal, to the UE, whether "the LTE radio frame boundary" is aligned with "the NR radio frame boundary", and, if they are not aligned with each other, the base station may additionally signal the offset (e.g., the offset is the value in the NR slot unit or the value in the LTE slot unit) to the UE. Alternatively, if the offset is not signaled, the NR UE may assume that the "LTE radio frame boundary" is aligned with the "NR radio frequency boundary" in the serving cell (LTE-NR coexistence cell).

TABLE 18

| |
|---|
| Bandwidth of an LTE carrier (carrierBandwidthDL) of an adjacent LTE cell |
| Frequency band of an LTE carrier (carrierFreqDL) of an adjacent LTE cell |
| MBSFN subframe configuration (mbsfn-SubframeConfigList) of an adjacent LTE cell |
| The number of CRS antenna ports (nrofCRS-Ports) of an adjacent LTE cell |
| $v_{shift}$ (v-Shift) of an adjacent LTE cell |
| Cell ID (cell ID) of an adjacent LTE cell |
| Cyclic prefix type (whether the CP is a normal CP or an extended CP) of an adjacent LTE cell |

According to an embodiment of the disclosure, the UE having received the information on the adjacent LTE cell(s) as described above may generate the sequence(s) of the CRS(s) of the adjacent LTE cell(s) based on this and acquire the mapping information of the time-frequency resource(s) of the CRS(s). In this case, the sequence of the CRS(s) may be generated as follows. Here, m may be an index of a resource block onto which the CRS is mapped.

The reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m + 1)),$$

$$m = 0, 1, \ldots, 2N_{RB}^{max,DL} - 1$$

wherein $n_s$ is the slot number within a radio frame and l is the OFDM symbol number within the slot. The pseudo-random sequence c(i) is define in Section 7.2. The pseudo-random sequence generator shall be initialized with $$c_{init} = 2^{10} \cdot (7 \cdot (n_x + 1) + I + 1) \cdot \left(2 \cdot \left(N_{ID}^{cell} + 1\right) + 2 \cdot N_{ID}^{cell} + N_{CP}\right.$$

at the start of each OFDM symbol where $$N_{CP} = \begin{cases} 1 & \text{for normal } CP \\ 0 & \text{for extended } CP \end{cases}$$

According to an embodiment of the disclosure, it is possible to estimate the channel between the adjacent LTE cell(s) and the UE from the received CRS signal of the adjacent LTE cell(s) based on the CRS sequence and time-frequency resource mapping information of the adjacent LTE cell(s) acquired as above.

Meanwhile, the base station may transmit a UECapabilityEnquiry message to the UE and receive a UE capability message for the interference cancellation capability from the UE. Further, based on this, the base station may configure the UE operation (interference cancellation or rate matching).

The UE may receive a UECapabilityEnquiry message from the base station and transmit a UE capability message for the interference cancellation capability to the base station. Further, the UE may receive the configuration information of the UE operation (interference cancellation or rate matching) from the base station and operate in accordance with the configuration information.

According to an embodiment of the disclosure, the CRS pattern information that the base station configures for the UE may include the CRS pattern information of the serving cell (LTE-NR coexistence cell) and the adjacent LTE cell(s). The base station may transmit, to the UE, control signals for at least some of operations (e.g., rate matching, interference cancellation, and existing operations) corresponding to the CRS pattern information. The control signal may be transmitted to the UE through the upper layer signaling (RRC), MAC control element (CE), and DCI. The UE may perform an operation in accordance with a combination of the at least one control signal.

[Specific Resource/CRS Rate Matching Schemes for PDSCH Reception in the Multi-TRP]

According to an embodiment of the disclosure, the UE having received data from a plurality of TRPs may determine whether the UE operation is "interference cancellation" or "rate matching" for each TRP in accordance with the TRP type.

Figure 8:
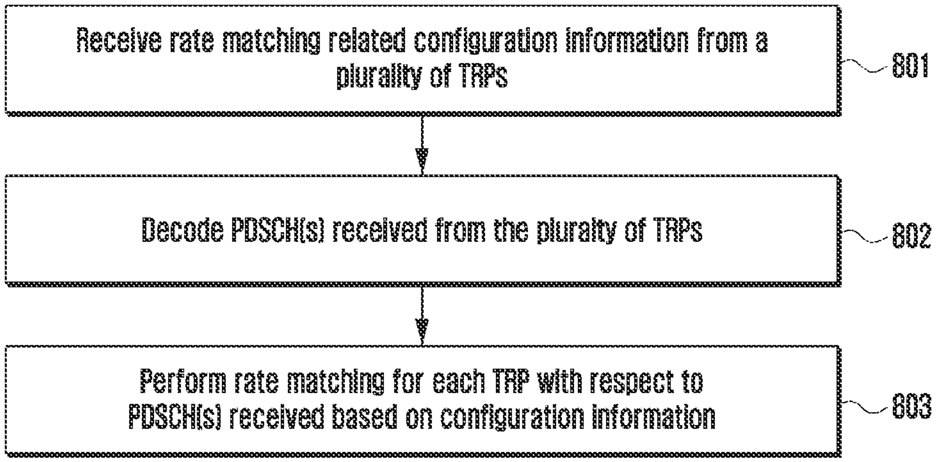
FIG. 8 is a diagram illustrating a method of a UE for performing rate matching with respect to a plurality of TRPs according to various embodiments.

FIG. 8 is a diagram illustrating an example method of a UE for performing rate matching with respect to a plurality of TRPs according to various embodiments.

With reference to FIG. 8, the UE may receive rate matching resource configuration information rateMatchPattern from the plurality of TRPs (801). The rate matching resource configuration information may be received through the upper layer signaling (RRC signaling).

In a case that each of the plurality of TRPs is the base station of the LTE-NR or NR-NR coexistence cell, the UE may decode the PDSCH received from the plurality of TRPs based on the rate matching resource configuration information (802). The UE may perform the rate matching for each TRP on the received PDSCH(s) resources based on the configuration information (803). Here, the rate matching may be performed in a method of excluding the resources of the symbol unit, RB unit, and RE unit, being identified through the configuration information from decoding of the PDSCH resources.

Further, in a case that each of the plurality of TRPs is the base station of the LTE-NR coexistence cell, the interference signal strength by the CRS, being received from the TRP that is nearest from the UE, may be very high as compared with the NR signal strength, and thus the rate matching for the specific resource or the CRS of the LTE may be necessary. In contrast, the ratio of the CRS signal strength being transmitted from the remaining TRPs to the NR signal strength may be relatively low as compared with that of the near TRP (i.e., this may mean that less interference is exerted by the CRS signal strength), and thus the interference cancellation operation for the specific resource or the CRS may be appropriate.

Alternatively, in contrast, it may be appropriate to perform the CRS interference cancellation from the nearest TRP and to perform the rate matching operation with respect to the resources transmitted by the CRS from the remaining TRPs. Accordingly, the UE may perform the interference cancellation operation with respect to the CRS resource being transmitted from the specific TRP, and perform the rate matching operation with respect to the CRS resource being transmitted from another TRP.

In this case, the TRP that performs the interference cancellation for the CRS and the rate matching for the CRS may be predefined through the NR standard document (i.e., pre-stored in the UE), or may be transferred to the UE through the control information or configuration information (e.g., RRC configuration) that the base station configures for the UE, or system information. The TRP predefined or configured for the UE may be expressed as an index value configured for each CORESET, for example, the CORESETPoolIndex value, physical cell ID (hereinafter, PCID), or SSB index. As an example, the rate matching for the CRS may be limitedly applied to the CORESET that is configured to CORESETPoolIndex=0, and the interference cancellation operation for the CRS may be limitedly applied to the CORESET that is configured to CORESETPoolIndex=1.

Figure 9:
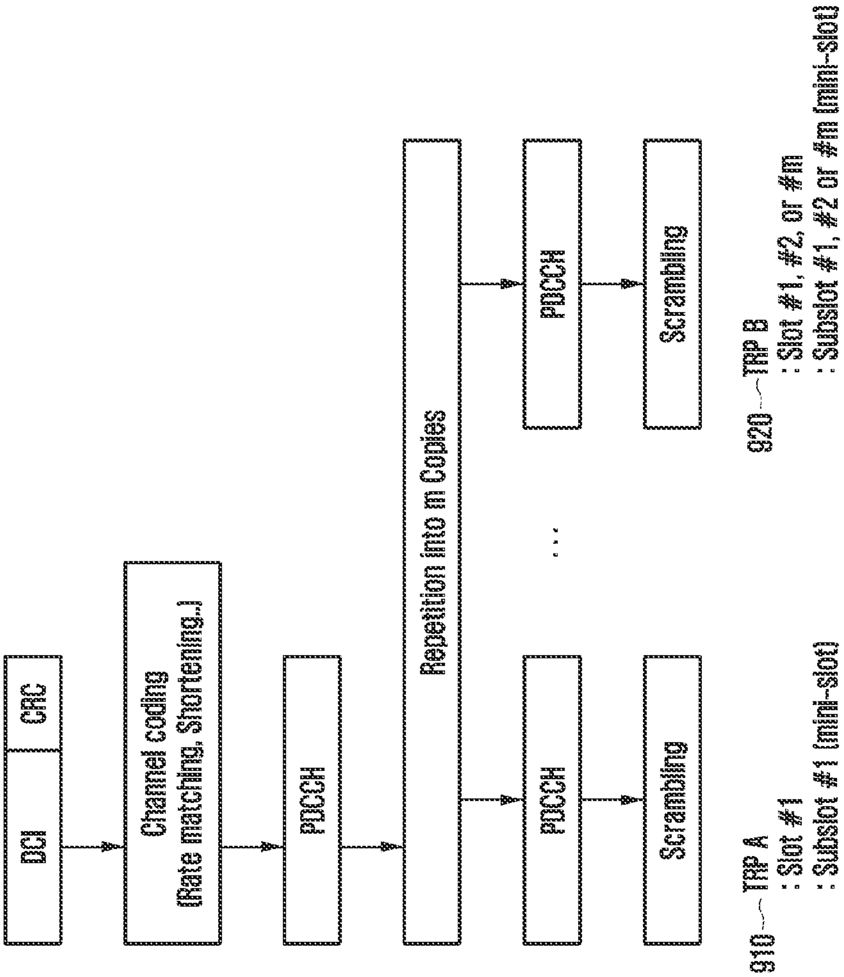
FIG. 9 is a diagram illustrating an example method in which a base station repeatedly transmits PDCCH according to various embodiments.

FIG. 9 is a diagram illustrating an example method in which a base station repeatedly transmits PDCCH according to various embodiments.

With reference to FIG. 9, in the communication system, the base station may transmit the DCI including the PUSCH or PDSCH scheduling information to the UE through the PDCCH. The base station may generate the DCI, attach a CRC to a DCI payload, and transmit the DCI to the UE through the PDCCH via the channel coding (in the disclosure, transmission of the DCI through the PDCCH may, for example, be referred to as the PDCCH transmission). In this case, the base station may copy the PDCCH as many as plural times, and distribute and transmit the copied PDCCHs on different CORESET or search space resources.

As illustrated in FIG. 9, for example, if the base station repeatedly transmits the PDCCH twice, the base station may repeatedly transmit the PDCCH based on the same or different beams in terms of a spatial domain by mapping the PDCCHs onto TRP A 910 and TRP B 920 one by one. If the base station repeatedly transmits the PDCCH four times, the base station may map the PDCCHs twice to correspond to TRP A 910 and TRP B 920, and, in this case, the two PDCCHs of each TRP may be discriminated and transmitted in the time domain. The PDCCH repeated transmission being discriminated in the time domain can be repeated in the slot based, sub-slot based, or mini-slot based time unit.

However, the above-described method is merely an example, and the repeated transmission method is not limited thereto. In the disclosure, the UE and the base station may consider the following various cases for the above-described PDCCH repetition operation. In the following embodiments, at least one of the following various cases will be described as an embodiment, but the PDCCH prepetition operation is not limited thereto.

1-1) PDCCH repetition in terms of time/frequency/spatial domain in the same slot in the same CORESET
1-2) PDCCH repetition in terms of time/frequency/spatial domain between different slots in the same CORESET
2-1) PDCCH repetition in terms of time/frequency/spatial domain in the same slot between different CORESETs/CORESET groups
2-2) PDCCH repetition in terms of time/frequency/spatial domain between different slots between different CORESETs/CORESET groups Further, the number of PDCCH repetitions may be independently increased, and thus the above-described methods may be considered to be simultaneously combined. The base station may configure information on which domain the PDCCH is repeatedly transmitted for the UE through the RRC message. For example, if the PDCCH repeated transmission is the PDCCH repeated transmission in terms of the time domain, the base station may preconfigure, for the UE, information on which one of the slot based, sub-slot based, or mini-slot based time units the transmission is repeated in accordance with.

If the PDCCH repeated transmission is the PDCCH repeated transmission in terms of the frequency domain, the base station may configure information on which one of the CORESET, bandwidth part (BWP), or component carrier (CC) the transmission is repeated based on for the UE.

If the PDCCH repeated transmission is the PDCCH repeated transmission in terms of the spatial domain, the base station may configure information related to the beam for the PDCCH repeated transmission through the configuration for each QCL type for the UE. Further, the base station may combine the aligned information and transmit the combined information to the UE through an RRC message. Accordingly, the base station may repeatedly transmit the PDCCH in accordance with the information configured through the RRC message, and the UE may repeatedly receive the PDCCH in accordance with the information configured through the RRC message.

Figure 10A:
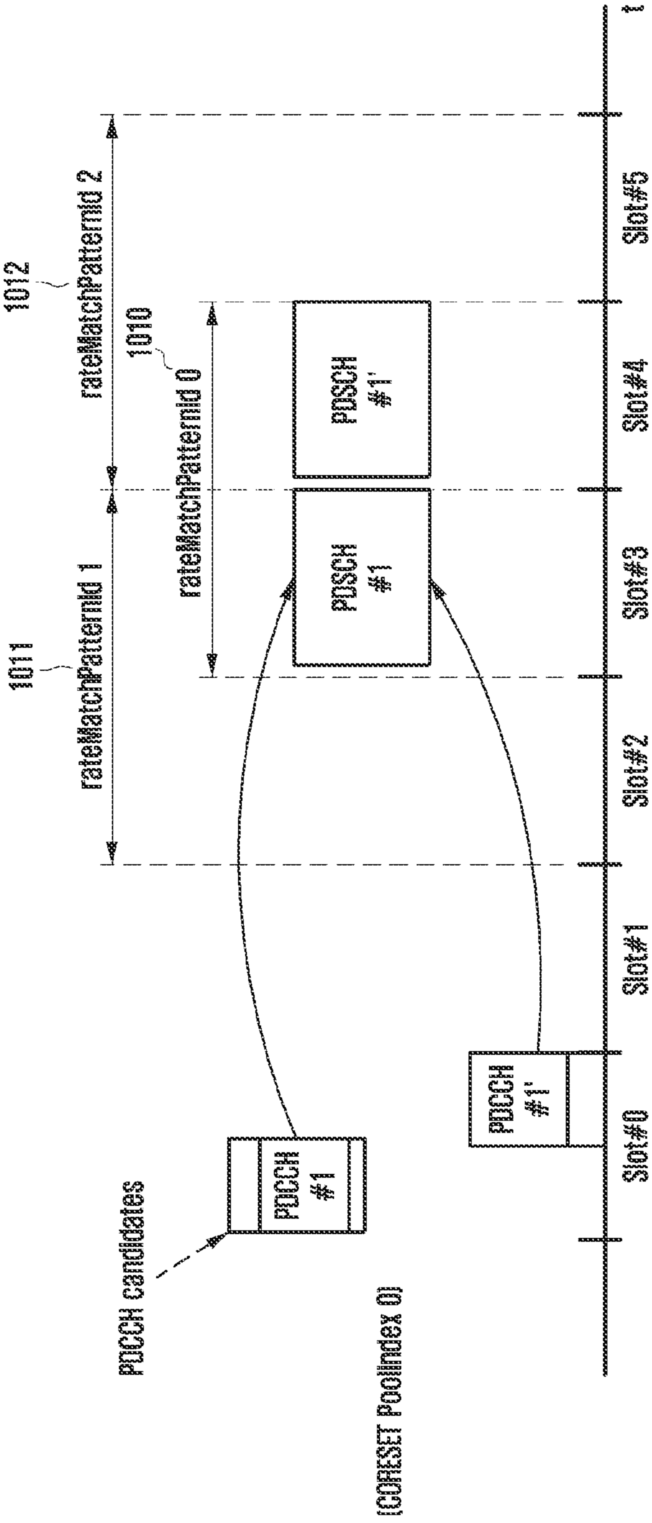
FIG. 10A is a diagram illustrating an example method for performing rate matching in case that PDDCH is repeatedly transmitted through a plurality of TRPs according to various embodiments.
Figure 10B:
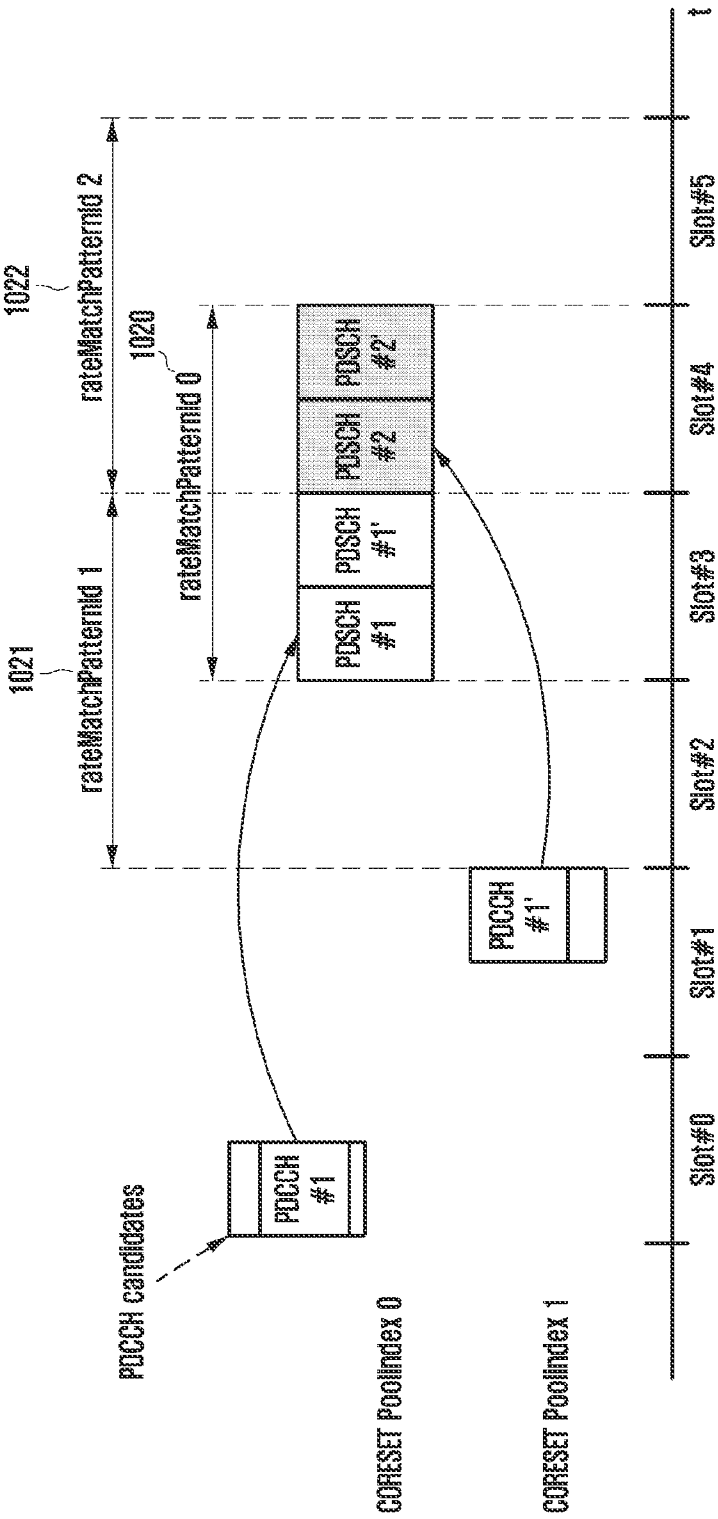
FIG. 10B is a diagram illustrating an example method for performing rate matching in case that PDDCH is repeatedly transmitted through a plurality of TRPs according to various embodiments.

FIGS. 10A and 10B are diagrams illustrating an example method for performing rate matching in a case that PDDCH is repeatedly transmitted through a plurality of TRPs according to various embodiments.

The UE may receive configuration information of rate matching resources rateMatchPattern from a plurality of TRPs.

Further, if each of the plurality of TRPs is the base station of the LTE-NR or NR-NR coexistence cell, the UE may perform the rate matching operation in the unit of an RB or a symbol based on the configuration information of the rate matching resources rateMatchPattern. That is, the UE may exclude the resources in the unit of an RB or a symbol from the PDSCH resources, and perform decoding.

Further, in a case of a non-SFN (single frequency network) based PDCCH repeated transmission, the PDSCH rate matching may be performed on the configured resources around two or more PDCCH candidates associated with the plurality of TRPs. Here, as a target to perform the rate matching of the PDSCH, a PDCCH resource or at least one reference signal may be considered.

According to an embodiment of the disclosure, as described above with reference to FIG. 9, the PDCCH may be transmitted to at least one UE through the plurality of TRPs. Here, the information being transmitted through PDCCH #1 and PDCCH #1' may be the same, and the information may schedule the resource for PDSCH # that is singly transmitted or repeatedly transmitted. As described above, if the information being transmitted through PDCCH #1 and PDCCH #1' are the same, the same resource (resource of PDSCH #1) can be scheduled in terms of time/frequency.

According to an embodiment of the disclosure, the rate matching may be performed not only in case that CORESETPoolindex is not configured through the upper layer as in FIG. 10A, or only one CORESETPoolindex 0 is configured (1010) and the PDCCH is repeatedly transmitted, but also in case that the CORESETPoolindex is separately configured (CORESETPoolindex 0, CORESETPoolindex 1) through the upper layer as in FIG. 10B, and the PDCCH is repeatedly transmitted.

Here, the rateMatchPatternId that the base station configures for the UE may cause the UE operation to differ depending on whether the PDSCH that is scheduled by the repeated PDCCH is repeatedly transmitted (once transmission of PDSCH #1, repeated transmission of PDSCH #1, once transmission of PDSCH #2, and repeated transmission of PDSCH #2).

In a case that one PDSCH #1 that is scheduled by the repeated PDCCH is transmitted, the UE may identify the rate matching pattern in accordance with the rateMatchPatternId configured by the base station, perform the rate matching of the PDSCH symbol, RB, or RE level based on this, and decode the received data.

Hereinafter, in a case that the PDSCH scheduled by the repeated PDCCH is repeatedly transmitted at least once, the rate matching may be performed in consideration of the following various embodiments in accordance with the time unit of the repeated transmission.

1) In a case that the PDSCH is repeatedly transmitted in the time domain resource (period) in which one rateMatchPattern (e.g., rateMatchPatternId 0) is configured, as in FIG. 10A, the UE may be expected to transmit PDSCH #1 or PDSCH #1' composed of the same HARQ process and TB at a time interval (e.g., slot #3-slot #4) corresponding to one rateMatchPatternId (e.g., rateMatchPatternId 0 (1010)). Further, the UE may be expected to perform the rate matching of the same pattern with respect to at least one PDSCH(s) scheduled by the PDCCH being repeatedly transmitted from the plurality of TRPs. In other words, it may mean that two or more rateMatchPattern are not applied with respect to at least one PDSCH(s) scheduled by the PDCCH that is repeatedly transmitted in the same slot (e.g., slot #0) from the plurality of TRPs.

Further, in a case that the PDSCH repeated transmission is configured, the UE may perform the rate matching by applying the rateMatchPatternId even if a part of the PDSCH gets out of the time interval corresponding to the rateMatchPatternId0 configured for the UE. In this case, the UE may drop the symbol that gets out of the time interval corresponding to the rateMatchPattern0. However, if the PDSCH completely gets out of the time interval corresponding to the rateMatchPattern0 (i.e., if there is not an overlapping interval), the UE may perform the rate matching for the PDSCH by applying the offset to the configured rateMatchPattern0.

As another example, in FIG. 10B, the UE may be expected that the base station transmits PDSCH #1, PDSCH

#1', PDSCH #2, and PDSCH #2' composed of the same HARQ process and TB at the time interval (e.g., slot #3-slot #4) corresponding to one rateMatchPatternId (e.g., rateMatchPatternId 0 (1020)). The PDSCH #1, PDSCH #1', PDSCH #2, and PDSCH #2' may be for the repeated transmission of the same data.

Further, the UE may be expected to perform the rate matching of the same pattern with respect to at least one PDSCH(s) scheduled by the PDCCH that is repeatedly transmitted from the plurality of TRPs. In other words, it means that two or more rateMatchPattern are not applied with respect to at least one PDSCH(s) scheduled by the PDCCH that is repeatedly transmitted through other slots (e.g., slot #0 to #1) from the plurality of TRPs. Meanwhile, the PDSCH (PDSCH #1 and PDSCH #1' from TRP1) (PDSCH #2 and PDSCH #2' from TRP2) scheduled by the PDCCH transmitted from one slot may mean the repeated transmission of the same data. Further, the PDSCH (PDSCH #1 and PDSCH #1' from TRP1/PDSCH #2 and PDSCH #2' from TRP2) scheduled through the PDCCH transmitted from different slots may be for the repeated transmission of different data or the repeated transmission of the same data.

Further, in a case that the PDSCH repeated transmission is configured, the UE may perform the rate matching by applying the rateMatchPatternId even if a part of the PDSCH gets out of the time interval corresponding to the rateMatchPatternId0 configured for the UE. In this case, the UE may drop the symbol that gets out of the time interval corresponding to the rateMatchPattern0. However, if the PDSCH completely gets out of the time interval corresponding to the rateMatchPattern0 (i.e., if there is not the overlapping interval), the UE may perform the rate matching for the PDSCH by applying the offset to the configured rateMatchPattern0.

2) In a case that the PDSCH is repeatedly transmitted out of the time domain resource (period) in which one rateMatchPattern is configured (or at least two rateMatchPattern are configured, and the PDSCHs on which the repeated transmission is configured correspond to different rateMatchPattern), as in FIG. 10A, the UE may be expected to transmit PDSCH #1 or PDSCH #1' composed of the same HARQ process and TB at a time interval (e.g., slot #3-slot #4) at which the base station is composed of two or more rateMatchPatternId (e.g., rateMatchPatternId 1 (1011) and rateMatchPatternId 2 (1012)). The PDSCH #1 or PDSCH #1' may be for the repeated transmission of the same data. The UE may be expected to perform the rate matching of a different pattern with respect to at least one PDSCH(s) scheduled by the PDCCH being repeatedly transmitted from at least one TRP. In other words, one rateMatchPattern (e.g., rateMatchPatternId 1 (1011)) may be applied with respect to some of at least one PDSCH scheduled by the PDCCH that is repeatedly transmitted in the same slot (e.g., slot #0) from the plurality of TRPs, and the other rateMatchPattern (e.g., rateMatchPatternId 2 (1012)) may be applied with respect to the remaining at least one PDSCH. Here, the MCS and the channel coding that are applied onto the PDSCH #1 or PDSCH #1' are basically the same, but may be configured as different values.

Further, in a case that the PDSCH repeated transmission is configured, the UE may perform the rate matching by applying the rateMatchPatternId1 even if a part of the PDSCH gets out of the time interval corresponding to the rateMatchPatternId1 configured for the UE. In this case, the UE may drop the symbol that gets out of the time interval corresponding to the rateMatchPattern1. Further, the UE may apply rateMatchPatternId2 with respect to the symbol that gets out of the time interval corresponding to the rateMatchPatternId1.

As another example, in FIG. 10B, the UE may be expected to transmit PDSCH #1, PDSCH #1', PDSCH #2, and PDSCH #2' composed of the same HARQ process and TB at the time interval (e.g., slot #3-slot #4) in which the base station is composed of two or more rateMatchPatternId (e.g., rateMatchPatternId 1 (1021) and rateMatchPatternId 2 (1022)). The PDSCH #1, PDSCH #1', PDSCH #2, and PDSCH #2' may be for the repeated transmission of the same data.

Further, the UE may be expected to perform the rate matching of a different pattern with respect to at least one PDSCH(s) scheduled by the PDCCH that is repeatedly transmitted from the plurality of TRPs. In other words, one rateMatchPattern (PDCCH #1 and rateMatchPatternId 1 correspond to each other, and PDCCH #1' and rateMatchPatternId 2 correspond to each other) may be applied in the unit of at least one PDSCH scheduled by each PDCCH being repeatedly transmitted through different slots (e.g., slot #0 to #1) from the plurality of TRPs. Meanwhile, the PDSCH (PDSCH #1 and PDSCH #1' from TRP1) (PDSCH #2 and PDSCH #2' from TRP2) scheduled by the PDCCH transmitted from one slot may mean the repeated transmission of the same data. Further, the PDSCH (PDSCH #1 and PDSCH #1' from TRP1/PDSCH #2 and PDSCH #2' from TRP2) scheduled through the PDCCH transmitted from different slots may be for the repeated transmission of different data or the repeated transmission of the same data. Here, the MCS and the channel coding that are applied onto the PDSCH #1 or PDSCH #2 are basically the same, but may be configured as different values.

3) In a case that the PDSCH is repeatedly transmitted out of the time domain resource (period) in which one rateMatchPattern is configured (or at least two rateMatchPattern are configured, and the PDSCHs on which the repeated transmission is configured correspond to different rateMatchPattern), as in FIG. 10A, the UE may be expected to transmit PDSCH #1 or PDSCH #1' composed of the same HARQ process and TB at the time interval (e.g., slot #3-slot #4) at which the base station is composed of two or more rateMatchPatternId (e.g., rateMatchPatternId 1 (1011) and rateMatchPatternId 2 (1012)). The PDSCH #1 or PDSCH #1' may be for the repeated transmission of the same data. The UE may be expected to perform the rate matching of the same pattern with respect to at least one PDSCH(s) scheduled by the PDCCH being repeatedly transmitted from the plurality of TRPs. In this case, the rate matching pattern may include the rate matching pattern configured through the lowest/highest rateMatchPatternId or lowest/highest CORESETPoolindex (e.g., CORESETPoolindex 0/CORESETPoolindex 1). Accordingly, even if a part of the repeatedly transmitted PDSCH gets out of the time interval corresponding to the rate matching pattern, the UE may perform the rate matching by applying the rate matching pattern.

Further, in a case that two or more different rate matching patterns are configured with respect to at least one PDSCH (s) scheduled by the PDCCH that is repeatedly transmitted from the plurality of TRPs, the UE may expect that rate matching configurations (rateMatchPatternId 1/rateMatchPatternId 2) used for an initial transmission or last transmission are used. In other words, if one rateMatchPattern (e.g., rateMatchPatternId 1) is applied to at least one PDSCH scheduled by the PDCCH that is repeatedly transmitted from the plurality of TRPs, the same rateMatchPattern (e.g., rateMatchPatternId 1) as that configured above may be applied to the remaining at least one PDSCH. Here, the MCS and the channel coding that are applied onto the PDSCH #1 or PDSCH #1' are basically the same, but may be configured as different values. As an embodiment, the case of FIG. 10B may operate in a similar manner as described above.

Figure 11A:
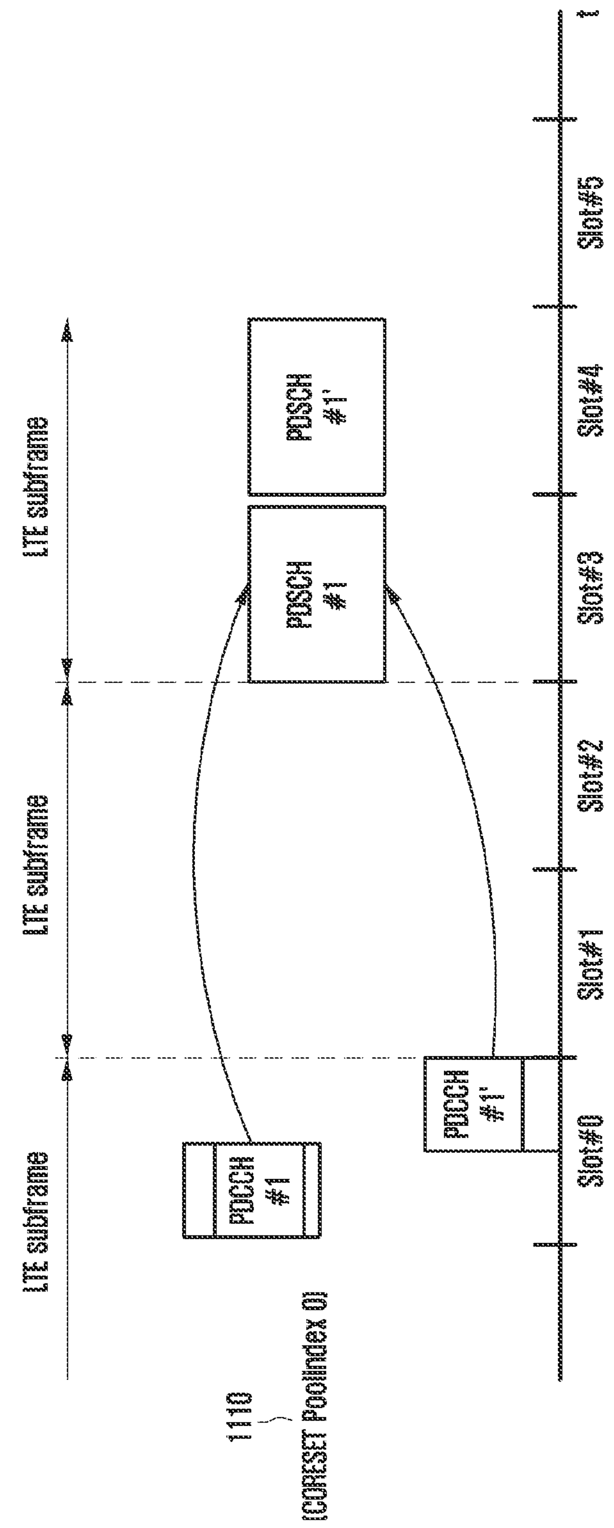
FIG. 11A is a diagram illustrating an example method for performing CRS rate matching in case that PDCCH is repeatedly transmitted through a plurality of TRPs according to various embodiments.
Figure 11B:
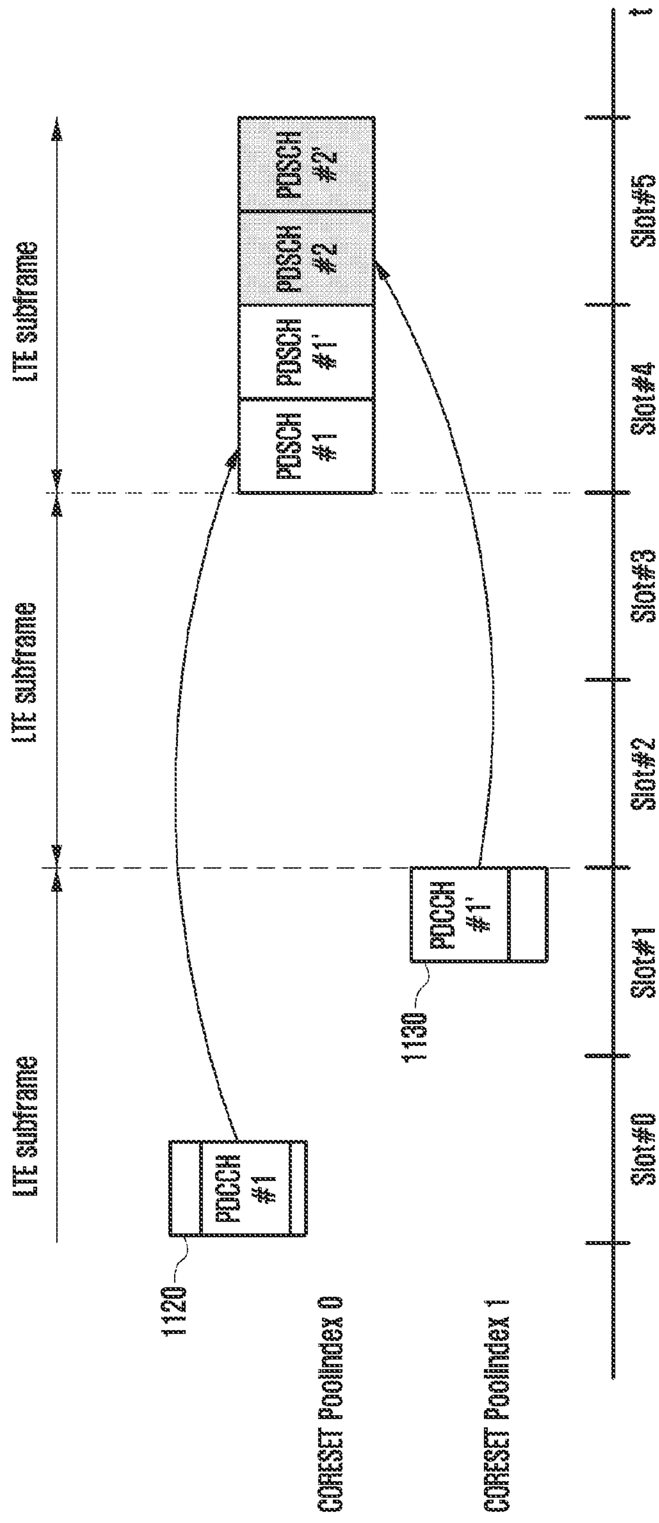
FIG. 11B is a diagram illustrating an example method for performing CRS rate matching in case that PDCCH is repeatedly transmitted through a plurality of TRPs according to various embodiments.

FIGS. 11A and 11B are diagrams illustrating an example method for performing CRS rate matching in case that PDCCH is repeatedly transmitted through a plurality of TRPs according to various embodiments.

According to an embodiment of the disclosure, a RateMatchPatternLTE-CRS IE may be configured for the UE through an upper layer. The RateMatchPatternLTE-CRS IE may be called CRS related rate matching pattern configuration information. The RateMatchPatternLTE-CRS IE may include an mbsfn-SubframeConfigList (this may be called MBSFN subframe configuration information).

The UE may identify slot(s) corresponding to (overlapping) the MBSFN subframe of the LTE among slots of the serving cell (LTE-NR coexistence cell) based on the mbsfn-SubframeConfigList, and may not perform the interference cancellation according to the embodiment in the identified slots. Further, the UE may perform the rate matching in the identified slot(s). Alternatively, the UE may perform the rate matching only in the CRS RE(s) existing in the MBSFN subframe.

According to an embodiment of the disclosure, the UE may receive the mbsfn-SubframeConfigList of the adjacent LTE cell(s) from the base station, may identify the slots corresponding to (overlapping) the MBSFN subframe of the LTE among the slots of the serving cell (LTE-NR coexistence cell), and may not perform the interference cancellation according to the above embodiments in the identified slot(s). Further, the UE may perform the rate matching in the identified slot(s). Alternatively, the UE may perform the rate matching only in the CRS RE(s) existing in the MBSFN subframe.

According to an embodiment of the disclosure, in a case that the CORESETPoolindex is not configured through the upper layer as in FIG. 11A, or one CORESETPoolindex (CORESETPoolindex 0) (1110) is configured, the parameter crs-RateMatch-PerCORESETPoolIndex-r16 is not configured to be enabled, but the RateMatchPatternLTE-CRS may be configured through the upper layer parameter lte-CRS-ToMatchAround configured by the base station. The RateMatchPatternLTE-CRS may be configuration information (e.g., at least one of carrierFreqDL, carrierBandwidthDL, mbsfn-subframeconfiglist, nrofCRS-ports, and v-shift) for configuring the CRS pattern of the adjacent LTE cell(s), and the UE may determine whether to map the rate matching based PDSCH or a mapping location based on the configuration information when decoding the PDSCH. The rateMatchPattern for the CRS of the LTE configured by the lte-CRS-ToMatchAround may be all configured and applied as one same pattern with respect to TRP 1 and TRP2.

According to an embodiment of the disclosure, as in FIG. 11B, the at least one TRP may repeatedly transmit the PDCCH to the UE. The PDCCH resources (PDCCH #1 and PDCCH #1') that are repeatedly transmitted by the base station may be configured by using the upper layer configuration, and for example, PDCCH #1 (1120) may be configured to CORESETPoolindex 0, and PDCCH #1' (1130) may be configured to CORESETPoolindex 1. Further, if the PDCCH that is repeatedly transmitted through the plurality of TRPs is configured to a different CORESETPoolindex, lte-CRS-PatternList1-r16 corresponding to the CORESETPoolindex 0 may be configured for TRP1, and lte-CRS-PatternList2-r16 corresponding to the CORESETPoolindex 1 may be configured for TRP2 in accordance with the CORESETPoolindex configured in the lte-CRS-ToMatchAround. Hereinafter, various embodiments are disclosed with respect to a RE-level rate matching application method based on the CRS pattern corresponding to the TRP1 or TRP2.

According to an embodiment of the disclosure, if the parameter crs-RateMatch-PerCORESETPoolIndex-r16 is configured to be enabled through the upper layer configuration, the UE may apply the CRS pattern corresponding to one of the TRP 1 and TRP2. In this case, the UE, in the plurality of TRPs, requires a rule for determining one default pattern among a plurality of CRS patterns (e.g., lte-CRS-PatternList1-r16 and lte-CRS-PatternList2-r16) corresponding to the respective TRPs configured through the PDSCH(s) being repeatedly transmitted at least once and the upper layer. Hereinafter, embodiments or rules for the UE to determine the default CRS pattern will be described.

1) The UE may perform the rate matching around at least one PDSCH(s) resource based on one CRS pattern corresponding to the CORESETPoolindex (e.g., CORESETPoolindex 0/CORESETPoolindex 1) values corresponding to the first (or starting)/last (or latest) transmitted PDCCH among the plurality of TRPs which repeatedly transmit the PDCCH (i.e., the UE may perform the rate matching with respect to the at least one PDSCH based on the CRS pattern). Specifically, the UE may determine the configuration for the first (or starting)/last (or latest) transmitted PDCCH resource by the explicit PDCCH candidate association configuration in the upper layer.

As an example, if the first (or starting) transmitted PDCCH #1 decoding has succeeded among the PDCCHs repeatedly transmitted by the base station, the UE may determine the CRS pattern corresponding to the CORESETPoolindex 0 value corresponding to PDCCH #1 as the default pattern. Specifically, the UE may perform the rate matching by using the values of carrierFreqDL, carrierBandwidthDL, mbsfn-SubframeConfigList, nrofCRS-Ports, and v-Shift, which are parameters included in the CRS pattern configuration information RateMatchPatternLTE-CRS configured in the lte-CRS-PatternList1-r16 associated with CORESETPoolindex 0 in the upper layer. That is, the UE may perform the rate matching by applying all the parameters to PDSCH #1, PDSCH #1', PDSCH #2, and PDSCH #2' being scheduled by the repeatedly transmitted PDCCHs.

2) The UE may perform the rate matching around at least one PDSCH(s) resource based on one CRS pattern corresponding to the TRP in which the lowest/highest CORESETPoolindex (e.g., CORESETPoolindex 0/CORESETPoolindex 1) are configured among the plurality of TRPs which repeatedly transmit the PDCCH (i.e., the UE may perform the rate matching with respect to the at least one PDSCH based on the CRS pattern).

As an example, the UE may perform the rate matching by using the values of carrierFreqDL, carrierBandwidthDL, mbsfn-SubframeConfigList, nrofCRS-Ports, and v-Shift, which are parameters included in the CRS pattern configuration information RateMatchPatternLTE-CRS configured in the lte-CRS-PatternList1-r16 associated with the lowest CORESETPoolindex (e.g., CORESETPoolindex 0) among the PDCCHs repeatedly transmitted by the base station. That is, the UE may perform the rate matching by applying all the parameters to PDSCH #1, PDSCH #1', PDSCH #2, and PDSCH #2' being scheduled by the repeatedly transmitted PDCCHs.

3) The UE may perform the rate matching on respective PDSCHs based on the CRS pattern corresponding to the CORESETPoolindex (e.g., CORESETPoolindex 0/CORESETPoolindex 1) values including the respective PDCCHs in the plurality of TRPs that repeatedly transmit the PDCCH.

As an example, if the decoding of PDCCH #1 has succeeded among the PDCCHs repeatedly transmitted by the base station, the UE may determine the CRS pattern corresponding to the CORESETPoolindex 0 value corresponding to PDCCH #1 as the rate matching pattern for PDSCH #1 and PDSCH #1'. Further, if the decoding of PDCCH #1' has succeeded among the PDCCHs repeatedly transmitted by the base station, the UE may determine the CRS pattern corresponding to the CORESETPoolindex 1 value corresponding to PDCCH #1' as the rate matching pattern for PDSCH #2 and PDSCH #2'. That is, in accordance with the CORESETPoolindex value including the PDCCH that schedules values of carrierFreqDL, carrierBandwidthDL, mbsfn-SubframeConfigList, nrofCRS-Ports, and v-Shift, which are parameters included in the CRS pattern configuration information RateMatchPatternLTE-CRS configured in the lte-CRS-PatternList1-r16 associated with the CORESETPoolindex 0 and the lte-CRS-PatternList2-r16 associated with the CORESETPoolindex 1 in the upper layer, the UE may perform the rate matching around the PDSCH resources by applying the lte-CRS-PatternList1-r16 to PDSCH #1 and PDSCH #1' and applying the lte-CRS-PatternList2-r16 to PDSCH #2 and PDSCH #2'.

4) If the UE receives upper layer signaling configuration information on the PDCCH repeated transmission (e.g., if two explicitly connected search space sets are configured for the UE), the UE may perform the rate matching for all PDSCHs based on the CRS pattern corresponding to the CORESETPoolindex (e.g., CORESETPoolindex 0/CORESETPoolindex 1) values including the respective PDCCHs in the plurality of TRPs transmitting the PDCCHs, regardless of the configuration values of the crs-RateMatch-PerCORESETPoolIndex-r16 parameters.

As an example, if the upper layer signaling for the PDCCH repeated transmission is received, the UE may determine both the CRS pattern corresponding to the CORESETPoolindex 0 value corresponding to PDCCH #1 and the CRS pattern corresponding to the CORESETPoolindex 1 value corresponding to PDCCH #1' as the rate matching pattern for PDSCH #2 and PDSCH #2' regardless of the configuration value of the parameter crs-RateMatch-PerCORESETPoolIndex-r16. That is, the UE may perform the rate matching by using the values of carrierFreqDL, carrierBandwidthDL, mbsfn-SubframeConfigList, nrofCRS-Ports, and v-Shift, which are parameters included in the CRS pattern configuration information RateMatchPatternLTE-CRS configured in the lte-CRS-PatternList1-r16 associated with CORESETPoolindex 0 and the lte-CRS-PatternList2-r16 associated with CORESETPoolindex 1 in the upper layer. That is, the UE may perform the rate matching around the PDSCH resources by applying both the lte-CRS-PatternList1-r16 and lte-CRS-PatternList2-r16 to PDSCH #1, PDSCH #1', PDSCH #2, and PDSCH #2' in accordance with the CORESETPoolindex value including the PDCCH performing scheduling.

Figure 12:
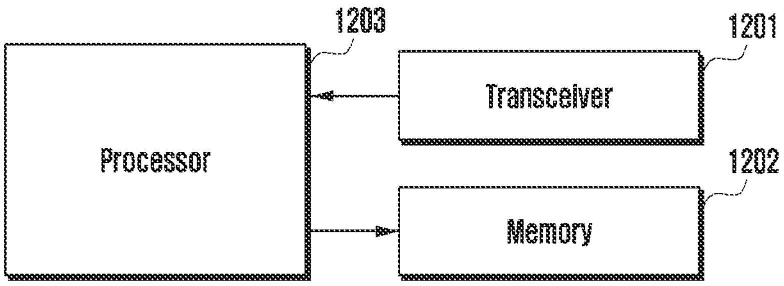
FIG. 12 is a block diagram of an example UE according to various embodiments.
Figure 13:
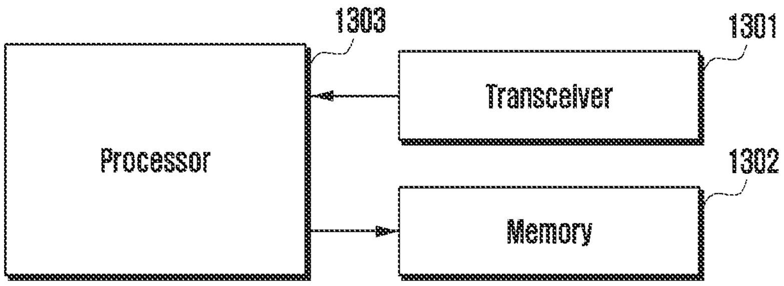
FIG. 13 is a block diagram of an example base station according various embodiments.

In order to perform the above-described embodiments of the disclosure, transceivers, memories, and processors of a UE and a base station are illustrated in FIGS. 12 and 13, respectively. In the above described example embodiments, a CRS pattern information configuration method for the adjacent LTE cell(s), an operation (interference cancellation or rate matching) configuration method, an operation indication method, and a UE capability information exchange method are presented. To perform this, the transceivers, memories, and processors of the base station and the UE should operate in accordance with the above-described embodiments.

FIG. 12 illustrates the structure of an example UE according to various embodiments.

With reference to FIG. 12, the UE may include a transceiver 1201, a memory 1202, and a processor 1203 (including, e.g., processing circuitry). However, the constituent elements of the UE are not limited to those of the above-described examples. For example, the UE may include more constituent elements or less constituent elements than the above-described constituent elements. In addition, the transceiver 1201, the memory 1202, and the processor 1203 may be implemented in the form of one chip.

According to an embodiment of the disclosure, the transceiver 1201 may transmit or receive a signal to or from the base station. The above-described signal may include control information and data. For this, the transceiver 1201 may, for example, include an RF transmitter up-converting and amplifying the frequency of the transmitted signal, and an RF receiver low-noise-amplifying the received signal and down-converting the frequency. Further, the transceiver 1201 may receive the signal on a radio channel, output the received signal to the processor 1203, and transmit the signal output from the processor 1203 on the radio channel.

According to an embodiment of the disclosure, the memory 1202 may, for example, store programs and data required for the UE operation. Further, the memory 1202 may store control information or data included in the signal that is transmitted or received by the UE. The memory 1202 may, for example, include storage media, such as a ROM, RAM, hard disk, CD-ROM, and DVD, or combinations of the storage media. Further, the memory 1202 may include a plurality of memories. According to an embodiment of the disclosure, the memory 1202 may store a program for interference cancellation or rate matching in some RE(s) in the PDSCH of the UE.

According to an embodiment of the disclosure, the processor 1203 may control a series of processes in which the UE can operate according to the embodiments of the disclosure. For example, the processor 1203 may perform rate matching for the PDSCH and control the decoding thereof according to embodiments of the disclosure.

Specifically, the processor 1203 may control the constitutions of the UE to receive configuration information for the rate matching pattern from the base station and to perform interference cancellation or rate matching according to the disclosure with respect to PDSCH repeated transmission. Further, the processor 1203 may control the constitutions of the UE to receive CRS pattern configuration related information about adjacent LTE cell(s) from the base station and to perform the interference cancellation or rate matching through some RE(s) in the PDSCH received from the base station based on the CRS pattern configuration related information about the adjacent LTE cell(s).

Further, the processor 1203 may include a plurality of processors, and may perform the rate matching method for the PDSCH according to embodiments of the disclosure through execution of the program stored in the memory 1202.

FIG. 13 illustrates the structure of an example base station according to various embodiments.

With reference to FIG. 13, the base station may include a transceiver 1301, a memory 1302, and a processor 1303 (including, e.g., processing circuitry). However, the constituent elements of the base station are not limited to those of the above-described examples. For example, the base station may include more constituent elements or less constituent elements than the above-described constituent elements. In addition, the transceiver 1301, the memory 1302, and the processor 1303 may be implemented in the form of one chip.

According to an example embodiment of the disclosure, the transceiver 1301 may transmit or receive a signal to or from the UE. The above-described signal may include control information and data. For this, the transceiver 1301 may, for example, include an RF transmitter up-converting and amplifying the frequency of the transmitted signal, and an RF receiver low-noise-amplifying the received signal and down-converting the frequency. Further, the transceiver 1301 may receive the signal on a radio channel, output the received signal to the processor 1303, and transmit the signal output from the processor 1303 on the radio channel.

According to an example embodiment of the disclosure, the memory 1302 may store programs and data required for the base station operation. Further, the memory 1302 may store control information or data included in the signal that is transmitted or received by the base station. The memory 1302 may, for example, include storage media, such as a ROM, RAM, hard disk, CD-ROM, and DVD, or combinations of the storage media. Further, the memory 1302 may include a plurality of memories.

According to an example embodiment of the disclosure, the memory 1302 may store a program for generating configuration information on at least one rate matching pattern and transmitting the generated information to the UE with respect to PDSCH repeated transmission of the base station. The memory 1302 may store the program for generating the configuration information on at least one rate matching pattern and transmitting the generated information to the UE with respect to the PDSCH repeated transmission of the base station, and a program for a downlink control channel that contains information indicating the interference cancellation or the rate matching or MAC CE generation and transmission. Further, the memory 1302 may store a program for generating CRS pattern configuration related information for adjacent LTE cell(s) of the base station and transmitting the generated information to the UE. Alternatively, the memory 1302 may store the program for generating the CRS pattern configuration related information for the adjacent LTE cell(s) of the base station and transmitting the generated information to the UE, and the program for the downlink control channel that contains the information indicating the interference cancellation or the rate matching or the MAC CE generation and transmission. The memory 1302 may additionally store a data mapping determination program for specific RE(s) in the PDSCH.

According to an example embodiment of the disclosure, the processor 1303 may control a series of processes in which the base station can operate according to the embodiments of the disclosure as described above. For example, the processor 1303 may control the constitutions of the base station for generation and transmission of the CRS pattern configuration information on the adjacent LTE cell(s), generation and transmission of information indicating the interference cancellation or the rate matching, and determination of data mapping onto the specific RE(s) in the PDSCH based on the configuration information and operating indication information.

Further, the processor 1303 may include a plurality of processors, and by executing the program stored in the memory 1302, the processor 1303 may perform the method for transmitting the configuration information on the rate matching pattern according to embodiments of the disclosure, the method for generating and transmitting the CRS pattern configuration related information about the adjacent LTE cell(s), the method for indicating the interference cancellation or the rate matching, or the symbol mapping method onto the specific RE(s) in the PDSCH based on the "configuration information" and the "operation indication information".

The methods according to claims of the disclosure and embodiments described in the description may be implemented in the form of hardware, software, or a combination of hardware and software.

In a case of implementation by software, a non-transitory computer readable storage medium storing one or more programs (software modules) or computer program products may be provided. One or more programs stored in the computer readable storage medium or computer program products are configured for execution by one or more processors in an electronic device. The one or more programs include instructions that cause the electronic device to execute the methods according to the claims of the disclosure or embodiments described in the description.

Such a program (software module or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile disc (DVD) or other types of optical storage devices, or a magnetic cassette. Further, the program may be stored in a memory composed of a combination of parts or the whole of them. Further, a plurality of memories may be included.

Further, the program may be stored in an attachable storage device that can be accessed through a communication network such as Internet, Intranet, local area network (LAN), wide LAN (WLAN), or storage area network (SAN) or a communication network composed of a combination thereof. The storage device may be accessed by a device that performs embodiments of the disclosure through an external port. Further, a separate storage device on the communication network may access a device that performs embodiments of the disclosure.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Meanwhile, embodiments of the disclosure disclosed in the specification and drawings are merely used to present specific examples to easily explain the technical contents of the disclosure and to help understanding of the disclosure, but are not intended to limit the scope of the disclosure. That is, it will be apparent to those of ordinary skill in the art to which the disclosure pertains that other modification examples based on the technical concept of the disclosure can be embodied. Further, as needed, the respective embodiments may be operated in combination. For example, parts of one embodiment and another embodiment of the disclosure may be combined to operate the base station and the UE. Further, the embodiments of the disclosure may be applied to other communication systems, and other modification examples based on the technical concept of the embodiments may also be embodied. For example, the embodiments may also be applied even to the LTE system and 5G or NR system.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a terminal in a communication system, the method comprising:

transmitting, to a base station, capability information on an interference cancellation;

receiving, from the base station, configuration information on a rate matching pattern, the configuration information comprising first information on a cell specific reference signal (CRS) pattern of a serving cell and second information on a CRS pattern of at least one adjacent cell;

receiving, from the base station, downlink control information (DCI) for scheduling a physical downlink shared channel (PDSCH) on a plurality of physical downlink control channels (PDCCHs);

based on the first information, performing decoding of a plurality of PDSCHs rate matched by the base station in a case that the plurality of PDSCHs is scheduled based on the DCI; and based on the second information, performing the interference cancellation.

2. The method of claim 1, wherein, based on the plurality of PDSCHs being transmitted in a time corresponding to one rate matching pattern, the one rate matching pattern is applied to the plurality of PDSCHs.

3. The method of claim 1, wherein, based on at least two rate matching patterns being configured for the plurality of PDSCHs, different rate matching patterns corresponding to each PDSCH are applied to the plurality of PDSCHs.

4. The method of claim 1, wherein, based on at least two rate matching patterns being configured for the plurality of PDSCHs, a rate matching pattern determined based on a predetermined rule is used, and wherein the predetermined rule includes at least one of a rate matching pattern used for initial transmission, a rate matching pattern used for last transmission, a rate matching pattern having the lowest index, or a rate matching pattern having the highest index.

5. A method performed by a base station in a communication system, the method comprising:

receiving, from a terminal, capability information on an interference cancellation;

transmitting, to the terminal, configuration information on a rate matching pattern, the configuration information comprising first information on a cell specific reference signal (CRS) pattern of a serving cell and second information on a CRS pattern of at least one adjacent cell;

transmitting, to the terminal, downlink control information (DCI) for scheduling a physical downlink shared channel (PDSCH) on a plurality of physical downlink control channels (PDCCHs); and performing rate matching according to the rate matching pattern corresponding to a plurality of PDSCHs based on the configuration information in a case that the plurality of PDSCHs is scheduled based on the DCI, wherein the second information on the CRS pattern of the at least one adjacent cell is used by the terminal in performing the interference cancellation.

6. The method of claim 5, wherein, based on the plurality of PDSCHs being transmitted in a time corresponding to one rate matching pattern, the one rate matching pattern is applied to the plurality of PDSCHs.

7. The method of claim 5, wherein, based on at least two rate matching patterns being configured for the plurality of PDSCHs, different rate matching patterns corresponding each PDSCH are applied to the plurality of PDSCHs.

8. The method of claim 5, wherein, based on at least two rate matching patterns being configured for the plurality of PDSCHs, a rate matching pattern determined based on a predetermined rule is used, and wherein the predetermined rule includes at least one of a rate matching pattern used for initial transmission, a rate matching pattern used for last transmission, a rate matching pattern having the lowest index, or a rate matching pattern having the highest index.

9. A terminal in a communication system comprising:

a transceiver; and a processor coupled with the transceiver and configured to:

transmit, to a base station, capability information on an interference cancellation, receive, from the base station, configuration information on a rate matching pattern, the configuration information comprising first information on a cell specific reference signal (CRS) pattern of a serving cell and second information on a CRS pattern of at least one adjacent cell, receive, from the base station, downlink control information (DCI) for scheduling a physical downlink shared channel (PDSCH) on a plurality of physical downlink control channels (PDCCHs), based on the first information, perform decoding of a plurality of PDSCHs rate matched by the base station in a case that the plurality of PDSCHs is scheduled based on the DCI, and based on the second information, perform the interference cancellation.

10. The terminal of claim 9, wherein, based on the plurality of PDSCHs being transmitted in a time corresponding to one rate matching pattern, the one rate matching pattern is applied to the plurality of PDSCHs.

11. The terminal of claim 9, wherein, based on at least two rate matching patterns being configured for the plurality of PDSCHs, different rate matching patterns corresponding to each PDSCH are applied to the plurality of PDSCHs.

12. The terminal of claim 9, wherein, based on at least two rate matching patterns being configured for the plurality of PDSCHs, a rate matching pattern determined based on a predetermined rule is used, and wherein the predetermined rule includes at least one of a rate matching pattern used for initial transmission, a rate matching pattern used for last transmission, a rate matching pattern having the lowest index, or a rate matching pattern having the highest index.

13. A base station in a communication system, the base station comprising:

a transceiver; and a processor coupled with the transceiver and configured to:

receive, from a terminal, capability information on an interference cancellation, transmit, to the terminal, configuration information on a rate matching pattern, the configuration information comprising first information on a cell specific reference signal (CRS) pattern of a serving cell and second information on a CRS pattern of at least one adjacent cell, transmit, to the terminal, downlink control information (DCI) for scheduling a physical downlink shared channel (PDSCH) on a plurality of physical downlink control channels (PDCCHs), and perform rate matching according to the rate matching pattern corresponding to a plurality of PDSCHs based on the configuration information in a case that the plurality of PDSCHs is scheduled based on the DCI, wherein the second information on the CRS pattern of the at least one adjacent cell is used by the terminal in performing the interference cancellation.

14. The base station of claim 13, wherein, based on the plurality of PDSCHs being transmitted in a time corresponding to one rate matching pattern, the one rate matching pattern is applied to the plurality of PDSCHs.

15. The base station of claim 13, wherein, based on at least two rate matching patterns being configured for the plurality of PDSCHs, different rate matching patterns corresponding to each PDSCH are applied to the plurality of PDSCHs, or wherein, based on at least two rate matching patterns being configured for the plurality of PDSCHs, a rate matching pattern determined based on a predetermined rule is used, and wherein the predetermined rule includes at least one of a rate matching pattern used for initial transmission, a rate matching pattern used for last transmission, a rate matching pattern having the lowest index, or a rate matching pattern having the highest index.

* * * * *